US010684850B2

(12) United States Patent
Zhu et al.

(10) Patent No.: US 10,684,850 B2
(45) Date of Patent: Jun. 16, 2020

(54) APPLICATION COMPONENT DEPLOYMENT METHOD AND DEPLOYMENT NODE

(71) Applicant: HUAWEI TECHNOLOGIES CO., LTD., Shenzhen, Guangdong (CN)

(72) Inventors: Huan Zhu, Hangzhou (CN); Qi Zhang, Beijing (CN); Yuqing Liu, Hangzhou (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/278,556

(22) Filed: Feb. 18, 2019

(65) Prior Publication Data

US 2019/0213004 A1  Jul. 11, 2019

Related U.S. Application Data

(63) Continuation of application No. PCT/CN2017/078583, filed on Mar. 29, 2017.

(30) Foreign Application Priority Data

Aug. 19, 2016  (CN) .......................... 2016 1 0700065

(51) Int. Cl.
*G06F 8/71* (2018.01)
*G06F 8/60* (2018.01)
(Continued)

(52) U.S. Cl.
CPC ................. *G06F 8/71* (2013.01); *G06F 8/60* (2013.01); *H04L 41/0672* (2013.01); *H04L 67/10* (2013.01); *H04L 67/34* (2013.01)

(58) Field of Classification Search
CPC . G06F 8/71; G06F 8/60; H04L 41/044; H04L 41/5045; H04L 67/10; H04L 67/34; H04L 41/0672
(Continued)

(56) References Cited

U.S. PATENT DOCUMENTS

| 6,681,391 | B1 * | 1/2004 | Marino | ...................... G06F 8/61 711/133 |
| 7,987,460 | B2 * | 7/2011 | Lo | .............................. G06F 8/60 717/168 |

(Continued)

FOREIGN PATENT DOCUMENTS

| CN | 103209162 A | 7/2013 |
| CN | 103475521 A | 12/2013 |

(Continued)

*Primary Examiner* — Marina Lee
(74) *Attorney, Agent, or Firm* — Womble Bond Dickinson (US) LLP

(57) ABSTRACT

Embodiment of this application disclose an application component deployment method and a deployment node. In the method, a target deployment node receives a first deployment instruction sent by a management server, and determines a kinship node of the target deployment node according to the first deployment instruction, and a second application component that is in the multiple application components and that corresponds to the parent node, where the kinship node includes a parent node. Then, when detecting that the parent node has deployed the second application component, the target deployment node sends a second deployment instruction to the parent node. The target deployment node deploys a first application component according to the first deployment instruction.

20 Claims, 6 Drawing Sheets

(51) Int. Cl.
*H04L 12/24* (2006.01)
*H04L 29/08* (2006.01)

(58) Field of Classification Search
USPC .......................................... 717/121, 168–178
See application file for complete search history.

(56) References Cited

U.S. PATENT DOCUMENTS

| | | | | |
|---|---|---|---|---|
| 8,082,352 | B2* | 12/2011 | Cui | G06F 8/61 |
| | | | | 709/227 |
| 8,209,679 | B2* | 6/2012 | Long | G06F 8/658 |
| | | | | 717/173 |
| 8,589,344 | B2* | 11/2013 | Williamson | G06F 16/9027 |
| | | | | 707/625 |
| 2007/0294309 | A1* | 12/2007 | Shwartz | G06F 9/5061 |
| 2009/0271781 | A1* | 10/2009 | Cui | G06F 8/61 |
| | | | | 717/173 |
| 2011/0131220 | A1* | 6/2011 | Williamson | G06F 16/83 |
| | | | | 707/755 |
| 2012/0102486 | A1* | 4/2012 | Yendluri | G06F 9/5072 |
| | | | | 717/177 |
| 2015/0186129 | A1* | 7/2015 | Apte | G06F 9/44505 |
| | | | | 717/174 |
| 2015/0215370 | A1 | 7/2015 | De La Chevrotiere et al. | |
| 2017/0228427 | A1* | 8/2017 | Yamada | G06F 9/505 |
| 2019/0213004 | A1* | 7/2019 | Zhu | G06F 8/71 |

FOREIGN PATENT DOCUMENTS

| | | |
|---|---|---|
| CN | 104765620 A | 7/2015 |
| CN | 105429791 A | 3/2016 |
| CN | 105635216 A | 6/2016 |
| CN | 105740003 A | 7/2016 |

\* cited by examiner

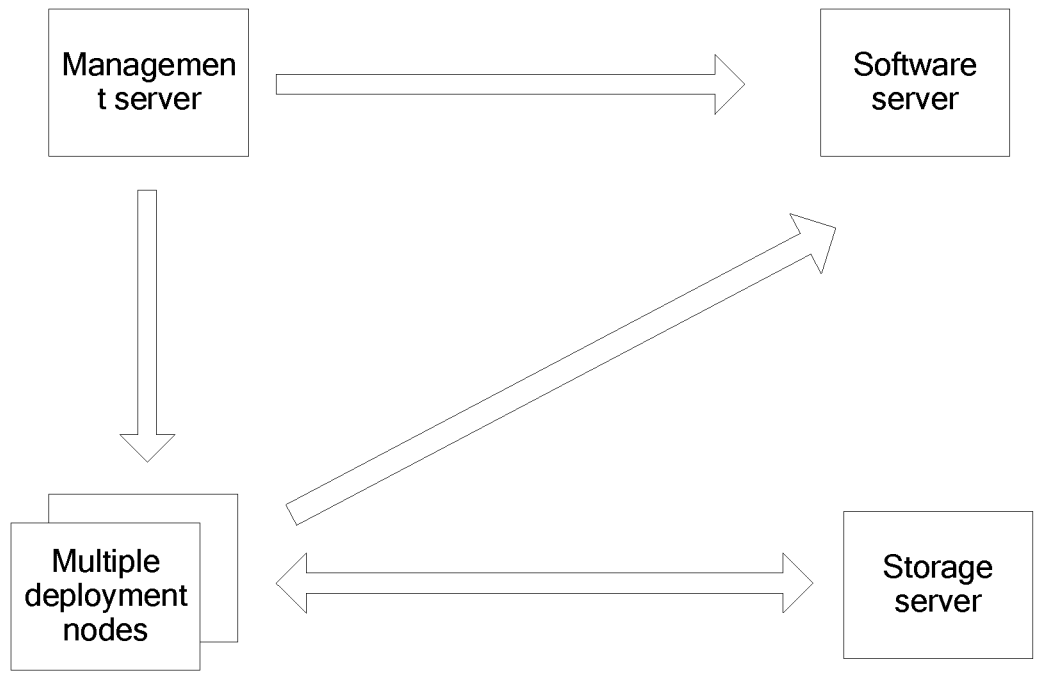
FIG. 1
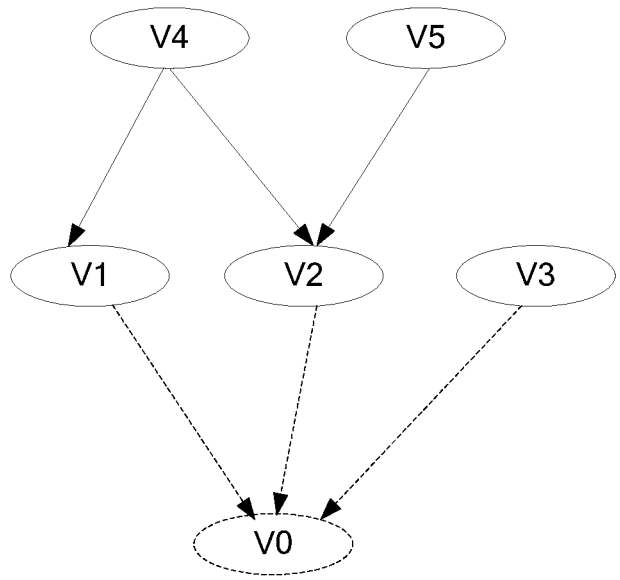
FIG. 1.1

APPLICATION COMPONENT DEPLOYMENT METHOD AND DEPLOYMENT NODE

CROSS-REFERENCE TO RELATED APPLICATIONS

This application is a continuation of International Application No. PCT/CN2017/078583, filed on Mar. 29, 2017, which claims priority to Chinese Patent Application No. 201610700065.6, filed on Aug. 19, 2016. The disclosures of the aforementioned applications are herein incorporated by reference in their entireties.

TECHNICAL FIELD

Embodiments of the invention relate to cloud computing technologies, and in particular, to an application component deployment method and a deployment node.

BACKGROUND

With development of cloud computing technologies, a cloud computing platform (also referred to as a cloud platform) emerges. The cloud platform features high concurrency, a large quantity of users, and the like. A user may deploy an application on the cloud platform according to the user's requirement. Generally, an application includes multiple application components. Each application component is used to implement some functions of the application. Specifically, the user may respectively deploy the multiple application components of the application on multiple deployment nodes of the cloud platform. The deployment nodes may be virtual machines or containers. There is a parent-child relationship between deployment nodes. When deploying an application component, a deployment node takes this relationship into consideration. This is specifically embodied in that an application component needs to meet a specific installation sequence during deployment. For example, if a deployment node A is a child node of a deployment node B, an application component A on the deployment node A can be installed only after an application component B on the deployment node B is installed.

Currently, a cloud platform application deployment server centrally controls an entire application deployment process by using a configuration management (CM) tool. In this manner, the deployment nodes relatively heavily depend on the cloud platform application deployment server. For example, if a cloud platform application deployment system becomes faulty in the entire application deployment process, some application components cannot be installed, and consequently an entire application cannot be deployed.

SUMMARY

Embodiments of the present invention provide an application component deployment method and a deployment node, so that dependence of a deployment node on a server may be reduced, so as to improve flexibility of application component deployment.

A first aspect of the present invention discloses an application deployment method. The method is used for deploying, on multiple deployment nodes, multiple application components of an application. The method includes:

receiving, by a target deployment node, a first deployment instruction sent by a management server, where the target deployment node is one of the multiple deployment nodes, and the first deployment instruction is used to instruct to deploy the application; determining, by the target deployment node, a kinship node of the target deployment node according to the first deployment instruction, where the kinship node includes a parent node, and determining, according to the first deployment instruction, a second application component that is in the multiple application components and that corresponds to the parent node; sending, by the target deployment node, a second deployment instruction to the parent node, where the second deployment instruction is used to instruct the parent node to deploy the second application component; and when detecting that the parent node has deployed the second application component, deploying, by the target deployment node, a first application component according to the first deployment instruction, where the first application component is an application component that is in the multiple application components and that corresponds to the target deployment node.

Each deployment node may record, in a storage server, a deployment status of an application component deployed on the deployment node. In this way, each deployment node may detect, from the storage server, a deployment status of another deployment node, and determine, according to the deployment status, whether the another deployment node has deployed an application component. Alternatively, each deployment node may proactively notify another deployment node of a deployment status of an application component deployed on the deployment node. The deployment status may include but is not limited to a non-deployed state, an under deployment state, a deployment completion state, a deployment failure state, and a fault state.

Before deploying an application component, each deployment node needs to determine whether the deployment node has a parent node and whether the parent node has deployed an application component. Deployment of an application component on each deployment node depends on deployment of an application component on a parent node of the deployment node. That is, the deployment node can deploy an application component only when the parent node of the deployment node has deployed an application component.

It may be learned that after receiving the first deployment instruction sent by the management server, the target deployment node may instruct the parent node of the target deployment node to deploy an application component. Then the target deployment node may also deploy an application component. In an entire process, dependence on a server is reduced, and a deployment node may automatically deploy an application component, so as to improve flexibility of application component deployment.

In one embodiment, the target deployment node can determine, according to the first deployment instruction, a kinship node of the target deployment node and a second application component. The kinship node includes a parent node, and the second application component is in the multiple application components and corresponds to the parent node. The determining of the kinship node and the second application component includes:

parsing, by the target deployment node, the first deployment instruction, so as to obtain a hierarchical relationship between the target deployment node and another deployment node, and a correspondence between an application component of the application and a deployment node included in the hierarchical relationship; and determining, by the target deployment node, the parent node of the target deployment node according to the hierarchical relationship, and determining, according to the correspondence, the second application component that is in the multiple application components and that corresponds to the parent node.

In one embodiment, the first deployment instruction carries the hierarchical relationship between the target deployment node and another deployment node, and the correspondence between an application component of the application and a deployment node included in the hierarchical relationship. In this way, the target deployment node may parse the first deployment instruction and directly extract the hierarchical relationship and the correspondence, determine the parent node of the target deployment node according to the hierarchical relationship, and determine, according to the correspondence, the second application component that is in the multiple application components and that corresponds to the parent node.

The hierarchical relationship and the correspondence may be presented in a form of an application deployment model diagram. The deployment model diagram is a deployment model diagram of the application. The application deployment model diagram may exist in the first deployment instruction. Alternatively, the hierarchical relationship and the correspondence may exist in the first deployment instruction in a form of a data packet or a frame.

In one embodiment, the first deployment instruction carries an application identifier of the application, and the determining, by the target deployment node, of a kinship node of the target deployment node according to the first deployment instruction, where the kinship node includes a parent node; and determining, according to the first deployment instruction, a second application component that is in the multiple application components and that corresponds to the parent node includes:

sending, by the target deployment node to a storage server, a deployment relationship obtaining request that carries the application identifier, where the deployment relationship obtaining request is used to request to obtain a deployment relationship of the application; receiving, by the target deployment node, the deployment relationship that is of the application and that is sent by the storage server in response to the deployment relationship obtaining request, where the deployment relationship of the application includes a hierarchical relationship between the target deployment node and another deployment node, and a correspondence between an application component of the application and a deployment node included in the hierarchical relationship; and determining, by the target deployment node, the parent node of the target deployment node according to the hierarchical relationship, and determining, according to the correspondence, the second application component that is in the multiple application components and that corresponds to the parent node.

In one embodiment, the storage server pre-stores the deployment relationship of the application. The deployment relationship of the application includes the hierarchical relationship between the target deployment node and another deployment node, and the correspondence between an application component of the application and a deployment node included in the hierarchical relationship. After receiving the first deployment instruction, the target deployment node may obtain, from the storage server, the hierarchical relationship between the target deployment node and another deployment node, and the correspondence between an application component of the application and a deployment node included in the hierarchical relationship. In this way, the target deployment node may determine the parent node of the target deployment node according to the hierarchical relationship, and determine, according to the correspondence, the second application component that is in the multiple application components and that corresponds to the parent node.

In one embodiment, the kinship node further includes a brother node, and the method further includes:

determining, by the target deployment node according to the first deployment instruction, a third application component that is in the multiple application components and that corresponds to the brother node; and when detecting that the parent node has deployed the second application component, sending, by the target deployment node, a third deployment instruction to the brother node, where the third deployment instruction is used to instruct the brother node to deploy the third application component.

It should be noted that after the parent node of the target deployment node has deployed the second application component, the target deployment node deploys the first application component. At the same time, the target deployment node may send the third deployment instruction to the brother node of the target deployment node, so as to trigger the brother node to deploy the third application component.

Alternatively, after finishing deploying the first application component, the target deployment node sends the third deployment instruction to the brother node of the target deployment node, so as to trigger the brother node to deploy the third application component.

A manner of "determining, by the target deployment node according to the first deployment instruction, a third application component that is in the multiple application components and that corresponds to the brother node" is similar to the manner of "determining, by the target deployment node, a kinship node of the target deployment node according to the first deployment instruction, where the kinship node includes a parent node; and determining, according to the first deployment instruction, a second application component that is in the multiple application components and that corresponds to the parent node", and details are not described herein again. For details, refer to the foregoing descriptions.

In one embodiment, the kinship node further includes a child node, and after the deploying, by the target deployment node, a first application component according to the first deployment instruction, the method further includes:

determining, by the target deployment node according to the first deployment instruction, a fourth application component that is in the multiple application components and that corresponds to the child node; and sending, by the target deployment node, a fourth deployment instruction to the child node, where the fourth deployment instruction is used to instruct the child node to deploy the fourth application component.

The target deployment node is a parent node of the child node, and installation of an application component on the child node depends on installation of an application component on the target deployment node. Therefore, after deploying the first application component according to the first deployment instruction, the target deployment node can send the fourth deployment instruction to the child node, so as to trigger the child node to deploy the fourth application component.

A manner of "determining, by the target deployment node according to the first deployment instruction, a fourth application component that is in the multiple application components and that corresponds to the child node" is similar to the manner of "determining, by the target deployment node, a kinship node of the target deployment node according to the first deployment instruction, where the kinship node includes a parent node; and determining, according to the first deployment instruction, a second application component that is in the multiple application components and that corresponds to the parent node", and details are not described herein again. For details, refer to the foregoing descriptions.

It may be learned that multiple deployment nodes may automatically perform an application component deployment operation, so as to reduce dependence on a server. This may not only simplify service logic of a cloud platform application deployment system, and enhance a capability of concurrently deploying applications in the cloud platform application deployment system, but also improve application deployment efficiency.

In one embodiment, the method further includes:

when the first application component becomes faulty during running, updating, by the target deployment node, a deployment status of the first application component to a fault state; re-deploying, by the target deployment node, the first application component; and after finishing re-deploying the first application component, updating, by the target deployment node, the deployment status of the first application component to a deployment completion state.

The first application component becomes faulty during running mainly due to two causes. The first cause is that the target deployment node on which the first application component is deployed becomes faulty, and the second cause is that the first application component becomes faulty. The first case in which the target deployment node becomes faulty is not considered in the present invention, and the second case is mainly considered in the present invention. It may be learned that when the first application component becomes faulty during running, the target deployment node may automatically perform an application component re-deployment operation, so as to implement automatic fault recovery.

In one embodiment, the method further includes:

receiving, by the target deployment node, an upgrade instruction sent by the management server, where the upgrade instruction instructs the target deployment node to upgrade the first application component; updating, by the target deployment node, a deployment status of the first application component to a non-deployed state; performing, by the target deployment node, an upgrade operation on the first application component according to the upgrade instruction; and updating, by the target deployment node, a deployment status of the upgraded first application component to a deployment completion state.

In this embodiment, because a new function of a service goes online or a problem needs to be resolved, an application component of the target deployment node may need to be upgraded. When the upgrade instruction sent by the management server is received, it is considered, by default, that no application component is installed on the target deployment node, the deployment status of the application component on the target deployment node needs to be updated to the non-deployed state. In addition, the upgrade operation is performed on the first application component according to an upgrade instruction. Further, the target deployment node needs to update the deployment status of the upgraded first application component to a deployment completion state.

A second aspect of the present invention discloses an application component deployment method. The method is used for deploying, on multiple deployment nodes, multiple application components of an application, and the method includes:

receiving, by a target deployment node, a first deployment instruction sent by a management server, where the target deployment node is one of the multiple deployment nodes, and the first deployment instruction is used to instruct to deploy the application; when detecting that a parent node of the target deployment node has deployed a second application component, deploying, by the target deployment node, a first application component according to the first deployment instruction, where the first application component is an application component that is in the multiple application components and that corresponds to the target deployment node, and the second application component is an application component that is in the multiple application components and that corresponds to the parent node; and determining, by the target deployment node according to the first deployment instruction, a third application component that is in the multiple application components and that corresponds to a brother node of the target deployment node; and sending, by the target deployment node, a third deployment instruction to the brother node, where the third deployment instruction is used to instruct the brother node to deploy the third application component; or determining, by the target deployment node according to the first deployment instruction, a fourth application component that is in the multiple application components and that corresponds to a child node of the target deployment node; and sending, by the target deployment node, a fourth deployment instruction to the child node, where the fourth deployment instruction is used to instruct the child node to deploy the fourth application component.

In this implementation, if the target deployment node determines that the parent node has deployed the second application component, the target deployment node does not need to wait for deployment of the application component on the parent node, but may directly deploy the first application component according to the first deployment instruction. At the same time, the target deployment node may further determine, according to the first deployment instruction, a third application component that corresponds to the brother node of the target deployment node, and send the third deployment instruction to the brother node, so as to trigger the brother node to deploy the third application component. In addition, the target deployment node may further determine, according to the first deployment instruction, the fourth application component that corresponds to the child node of the target deployment node, and send the fourth deployment instruction to the child node, so as to trigger the child node to deploy the fourth application component.

It may be learned that after receiving the first deployment instruction sent by the management server, the target deployment node may instruct the brother node or the child node to deploy an application component. The target deployment node may also deploy an application component. In an entire process, dependence on a server is reduced, and a deployment node may automatically deploy an application component, so as to improve flexibility of application component deployment.

In one embodiment, the determining, by the target deployment node according to the first deployment instruction, a third application component that is in the multiple application components and that corresponds to a brother node of the target deployment node includes:

parsing, by the target deployment node, the first deployment instruction, so as to obtain a hierarchical relationship between the target deployment node and another deployment node, and a correspondence between an application component of the application and a deployment node included in the hierarchical relationship; and determining, by the target deployment node, the brother node of the target deployment node according to the hierarchical relationship, and determining, according to the correspondence, the third application component that is in the multiple application components and that corresponds to the brother node.

In one embodiment, the first deployment instruction carries an application identifier of the application, and the determining, by the target deployment node according to the first deployment instruction, a third application component that is in the multiple application components and that corresponds to a brother node of the target deployment node includes:

sending, by the target deployment node to a storage server, a deployment relationship obtaining request that carries the application identifier, where the deployment relationship obtaining request is used to request to obtain a deployment relationship of the application; receiving, by the target deployment node, the deployment relationship that is of the application and that is sent by the storage server in response to the deployment relationship obtaining request, where the deployment relationship of the application includes a hierarchical relationship between the target deployment node and another deployment node, and a correspondence between an application component of the application and a deployment node included in the hierarchical relationship; and determining, by the target deployment node, the brother node of the target deployment node according to the hierarchical relationship, and determining, according to the correspondence, the third application component that is in the multiple application components and that corresponds to the brother node.

It should be noted that a manner of "determining, by the target deployment node according to the first deployment instruction, a fourth application component that is in the multiple application components and that corresponds to a child node of the target deployment node" is similar to the manner of "determining, by the target deployment node according to the first deployment instruction, a third application component that is in the multiple application components and that corresponds to a brother node of the target deployment node", and details are not described herein again. For details, refer to the foregoing descriptions.

A third aspect of the present invention discloses a deployment node, including function units configured to perform some or all of the operations of any method in the first aspect of embodiments of the present invention. When the deployment node performs some or all of the operations of any method in the first aspect, dependence of the deployment node on a server may be reduced, so as to improve flexibility of application component deployment.

A fourth aspect of embodiments of the present invention discloses a deployment node, including function units configured to perform some or all of the operations of any method in the second aspect of the embodiments of the present invention. When the deployment node performs some or all of the operations of any method in the second aspect, dependence of the deployment node on a server may be reduced, so as to improve flexibility of application component deployment.

A fifth aspect of embodiments of the present invention discloses a physical machine. Multiple deployment nodes are deployed on the physical machine. The physical machine includes: a processor, a receiver, a transmitter, and a memory. The memory is configured to store an instruction, the processor is configured to run the instruction, and the processor runs the instruction to perform some or all of the operations of any method in the first aspect of the embodiments of the present invention. When the deployment node performs some or all of the operations of any method in the first aspect, dependence of the deployment node on a server may be reduced, so as to improve flexibility of application component deployment.

A sixth aspect of embodiments of the present invention discloses a physical machine. Multiple deployment nodes are deployed on the physical machine. The physical machine includes: a processor, a receiver, a transmitter, and a memory. The memory is configured to store an instruction, the processor is configured to run the instruction, and the processor runs the instruction to perform some or all of the operations of any method in the second aspect of the embodiments of the present invention. When the deployment node performs some or all of the operations of any method in the second aspect, dependence of the deployment node on a server may be reduced, so as to improve flexibility of application component deployment.

A seventh aspect of embodiments of the present invention discloses a computer storage medium, where the computer storage medium stores a program, and the program specifically includes an instruction used to perform some or all of the operations of any method in the first aspect of the embodiments of the present invention.

An eighth aspect of embodiments of the present invention discloses a computer storage medium, where the computer storage medium stores a program, and the program specifically includes an instruction used to perform some or all of the operations of any method in the second aspect of the embodiments of the present invention.

In some possible implementations, after the determining, by the target deployment node, of a kinship node of the target deployment node according to the first deployment instruction, where the kinship node includes a parent node, and determining, according to the first deployment instruction, a second application component that is in the multiple application components and that corresponds to the parent node, the target deployment node may further detect whether the parent node has deployed the second application component. When detecting that the parent node has not deployed the second application component, the target deployment node sends a second deployment instruction to the parent node; or when detecting that the parent node has deployed the second application component, the target deployment node does not need to send a second deployment instruction to the parent node. In this way, system resources can be saved.

In some possible implementations, when determining that the target deployment node has no parent node, the target deployment node deploys the first application component. In this case, the target deployment node has no parent node, that is, the first application component has no application component to depend on. In this case, the target deployment node does not need to wait, but may directly deploy the first application component.

In some possible implementations, after finishing deploying the first application component, the target deployment node updates the deployment status of the first application component to a deployment completion state.

In some possible implementations, after finishing deploying the second application component, the parent node updates a deployment status of the second application component to a deployment completion state.

In some possible implementations, after finishing deploying the third application component, the brother node updates a deployment status of the third application component to a deployment completion state.

In some possible implementations, after finishing deploying the fourth application component, the child node updates a deployment status of the fourth application component to a deployment completion state.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic diagram of a network architecture of a cloud platform application deployment system according to an embodiment of the present invention;

FIG. 1.1 is a schematic diagram of an application deployment model diagram according to an embodiment of the present invention;

DESCRIPTION OF EMBODIMENTS

Figure 2:
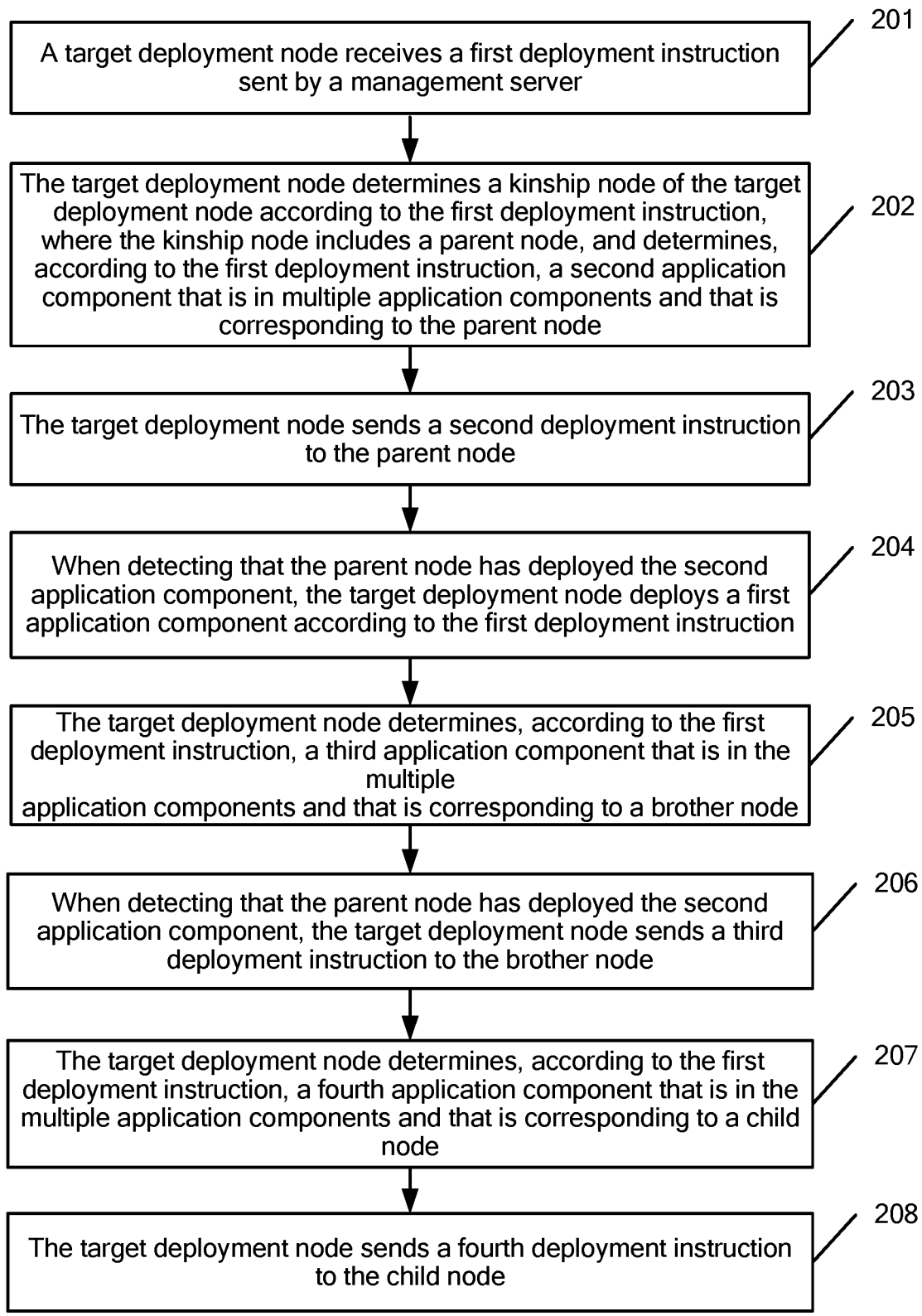
FIG. 2 is a schematic flowchart of an application component deployment method according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the specification and claims of the present invention, the terms "first", "second", "third", "fourth", and so on are intended to distinguish between different objects but do not indicate a particular order. In addition, the terms "including", "having", or any other variant thereof, are intended to cover a non-exclusive inclusion. For example, a process, a method, a system, a product, or a device that includes a series of operations or units is not limited to the listed operations or units, but can further includes an unlisted operation or unit, or can further includes another inherent operation or unit of the process, the method, the product, or the device.

An "embodiment" mentioned in this specification means that a specific feature, structure, or characteristic described with reference to the embodiments may be included in at least one embodiment of the present invention. This phrase appearing in various locations of this specification does not necessarily mean a same embodiment, or an independent or a candidate embodiment that is exclusive to another embodiment. A person skilled in the art explicitly or implicitly understands that the embodiments described in this specification may be combined with another embodiment.

The embodiments of the present invention disclose an application deployment method and a deployment node, so that dependence of a deployment node on a server may be reduced, so as to improve flexibility of application component deployment. Details are separately described in the following.

To better understand an application component deployment method disclosed in an embodiment of the present invention, the following first describes a network architecture applicable to this embodiment of the present invention.

Referring to FIG. 1, FIG. 1 is a schematic diagram of a network architecture of a cloud platform application deployment system according to an embodiment of the present invention. As shown in FIG. 1, the cloud platform application deployment system includes: a management server, multiple deployment nodes, a software server, and a storage server. In the cloud platform application deployment system shown in FIG. 1, the application component deployment method disclosed in this embodiment of the present invention may be performed.

The management server (for example, a cloud platform application deployment server) is mainly configured to deliver, to any one of the multiple deployment nodes, a deployment instruction that is used to instruct to deploy an application. The application may include multiple application components. Each application component is used to implement some functions of the application.

The deployment node may include but is not limited to a virtual machine (Virtual Machine, VM), a container (Docker), or a physical machine. There is a hierarchical relationship between deployment nodes. The hierarchical relationship includes a parent-child relationship. In addition, there is a correspondence between an application component of the application and a deployment node included in the hierarchical relationship. That is, each deployment node has a corresponding application component. Multiple deployment nodes may be deployed on a same physical machine. Multiple deployment nodes of different hierarchies may be deployed on a same physical machine. Generally, when deploying an application component, a deployment node takes the parent-child relationship into consideration. This is specifically embodied in that an application component needs to meet a specific installation sequence during deployment. For example, if a deployment node A is a child node of a deployment node B, an application component A on the deployment node A can be installed only after an application component B on the deployment node B is installed. In addition, the hierarchical relationship further includes a brother relationship. Deployment nodes that have a brother relationship may not take an installation sequence into consideration when deploying an application component.

In a data model (such as a hierarchical model and a mesh model) of database management, if a node has an upper-level node, the upper-level node is referred to as a parent node (the parent node) of the node; if a node has a lower-level node, the lower-level node is referred to as a child node (the children node) of the node; or if a node has a same-level node, the same-level node is referred to as a brother node (the siblings node) of the node.

It may be learned that the parent-child relationship between deployment nodes is essentially a dependency between to-be-installed application components on the deployment nodes. For example, it is assumed that a Docker application management system application needs to be deployed. The Docker application management system application includes two application components: an application orchestration scheduler and MySQL. Installation of the application orchestration scheduler depends on installation of MySQL. In an application deployment model diagram, a deployment node of a to-be-installed application orchestration scheduler depends on a deployment node of to-be-installed MySQL. The application orchestration scheduler is software for orchestrating and deploying a Docker application.

In one embodiment, the hierarchical relationship and the correspondence may be presented in a form of a deployment model diagram. The deployment model diagram is a deployment model diagram of a to-be-deployed application. The deployment model diagram may be stored in the storage server. Alternatively, the hierarchical relationship and the correspondence may exist, in a form of a data packet or a frame, in a deployment instruction delivered by the management server. In one embodiment, the deployment model diagram may further carry an address of an application software package. The address of the application software package is used by the deployment node to obtain a software package of an application according to the address of the application software package.

The software server is configured to store an application software package, a dependency package, or the like. The application software package may be a general purpose application software package, such as a mirror of a VM, a Docker mirror or a software package of MySQL, or a mirror or a software package of nginx, or may be a private application software package of a user.

The storage server may include but is not limited to a key-value storage system etcd, a relational database management system MySQL, and a configuration file (config). The storage server may store the hierarchical relationships between multiple deployment nodes and the correspondence between an application component of the application and a deployment node included in the hierarchical relationship. In addition, the storage server may further record a deployment status of an application component deployed on each deployment node. The deployment status may include but is not limited to a non-deployed state, an under deployment state, a deployment completion state, a deployment failure state, and a fault state.

It should be noted that the foregoing storage server may be integrated as a module in the management server or the software server, or the foregoing storage server may be separately deployed.

In the cloud platform application deployment system shown in FIG. 1, when a user needs to deploy an application in the cloud platform application deployment system, the user may pre-specify a deployment node and application components that each deployment node needs to install, set information (such as a VM mirror, an application software package, or an installation manner) about the deployment node, and specify a hierarchical relationship between deployment nodes and a correspondence between an application component of an application and a deployment node included in the hierarchical relationship. Then the management server may send an application software package (which is generally a private application software package of a user) of a to-be-deployed application to the software server, so that the software server stores the application software package of the to-be-deployed application, and subsequently, a deployment node may obtain the application software package from the software server, so as to perform an application component deployment operation.

In addition, the management server may send a deployment instruction to a target deployment node (that is, any deployment node) in the multiple deployment nodes, so as to trigger the target deployment node to determine, according to the deployment instruction, a parent node of the target deployment node and an application component corresponding to the parent node, determine a brother node of the target deployment node and an application component corresponding to the brother node, and determine a child node of the target deployment node and an application component corresponding to the child node. Further, the target deployment node instructs the parent node, the brother node, and the child node to deploy the application components, and the target deployment node deploys an application component, until an entire application is deployed.

Referring to FIG. 1.1, FIG. 1.1 is a schematic diagram of an application deployment model diagram according to an embodiment of the present invention. The application deployment model diagram is used to record the hierarchical relationship between multiple deployment nodes, and the correspondence between an application component of the application and a deployment node included in the hierarchical relationship.

As shown in FIG. 1.1, the application deployment model diagram is a directed diagram, and arrows indicate dependencies. FIG. 1.1 includes multiple deployment nodes, such as V1, V2, V3, V4, and V5. Each deployment node corresponds to one application component. In addition, FIG. 1.1 further includes V0. V0 is a virtual start node, and does not represent any deployment node. V0 is mainly used to ensure that no isolated deployment node exists in the deployment model diagram. For example, if there is no V0, V3 is an isolated node. A directed line with an arrow indicates a dependency (that is, a parent-child relationship), and indicates that a start point depends on an end point in any dependency. The start point may be referred to as a child node, and the end point may be referred to as a parent node. For two deployment nodes between which there is a dependency, an application component on the child node can be installed only after an application component on the parent node is installed. For example, V4 depends on V1 and V2; V4 is a child node of V1 and V2; and both V1 and V2 are parent nodes of V4. If V4 needs to install an application component, V4 can install the application component only after application components on V1 and V2 are installed. Likewise, V5 depends on V2; V2 is a parent node of V5; and V5 is a child node of V2. V5 can install an application component only after an application component on V2 is installed. In addition, V0 is a parent node of V1, V2, and V3. However, because V0 is a virtual start node, and does not represent any deployment node, V0 does not need to install an application component, and the system may consider, by default, that an installation status of an application component on V0 is successful installation. In this case, when installing an application component, V1, V2, or V3 may separately and directly install an application component, with no need to wait for installation of an application component on V0.

In addition, the deployment model diagram may further indicate a brother relationship between deployment nodes. For example, V4 and V5 are brother nodes of each other, and V1, V2, and V3 are brother nodes of each other.

The management server may deliver a first deployment instruction to any deployment node (referred to as a target deployment node) on which an application component is to be installed. After receiving the first deployment instruction, and determining a hierarchical relationship between the target deployment node and another deployment node, and a correspondence between an application component of the application and a deployment node included in the hierarchical relationship, the target deployment node may determine, according to the hierarchical relationship, whether the target deployment node has a parent node; if the target deployment node has a parent node, further determine whether the parent node has deployed a second application component; and if the parent node has not deployed the second application component, send a second deployment instruction to the parent node. After receiving the second deployment instruction, the parent node deploys the second application component. When detecting that the parent node has deployed the second application component, the target deployment node deploys a first application component according to the correspondence. Further, the target deployment node determines a brother node of the target deployment node according to the hierarchical relationship, and further determines that the brother node has not deployed a third application component. The target deployment node may send a third deployment instruction to the brother node. After receiving the third deployment instruction, the brother node deploys the third application component. Still further, when finishing deploying the first application component, the target deployment node determines a child node of the target deployment node according to the hierarchical relationship, and further determines that the child node has not deployed a fourth application component. The target deployment node may send a fourth deployment instruction to the child node. After the child node receives the fourth deployment instruction, the child node deploys the fourth application component. When application component deployment on all deployment nodes is completed, deployment of an entire application is completed.

It should be noted that for each deployment node, after receiving a deployment instruction, the deployment node needs to first detect whether a parent node on which the deployment node depends finishes deploying an application component. If the parent node finishes deployment, the deployment node can deploy an application component. It may be learned that in an entire application deployment process, dependence of a deployment node on a server is reduced, and the deployment nodes do not need to always wait for a deployment task delivered by the server, but may automatically deploy an application component, so as to improve flexibility of application component deployment.

It should be noted that when a service scenario of an application changes, and a problem needs to be resolved, correspondingly, the application deployment model diagram also changes.

Scenarios in which the application deployment model diagram needs to change mainly include the following two types: an application component auto scale-in scenario and an application component auto scale-out scenario.

In the application component auto scale-in scenario, generally, at least two of multiple deployment nodes process a same service. In this case, to save resources, at least one of the at least two deployment nodes needs to be deleted. Deployment nodes change, and correspondingly, the application deployment model diagram needs to be updated.

In the application component auto scale-out scenario, generally, a scale-out node of a deployment node or scale-out nodes of some deployment nodes needs or need to be added. A hierarchical relationship between the scale-out node of the deployment node and another deployment node is consistent with a hierarchical relationship between the deployment node and another deployment node. For example, in the application deployment model diagram shown in FIG. 1.1, a scale-out node V6 of V1 needs to be added. In this case, V6 and V1, V2, and V3 are brother nodes of each other; V6 is a parent node of V4; and a parent node of V6 is the virtual start node V0. Because kinship of deployment nodes changes after the scale-out node is added, the application deployment model diagram needs to be updated.

Referring to FIG. 2, FIG. 2 is a schematic flowchart of an application deployment method according to an embodiment of the present invention. The method is used for deploying, on multiple deployment nodes, multiple application components of an application. As shown in FIG. 2, the method includes the following operations.

In operation 201, a target deployment node receives a first deployment instruction sent by a management server.

The target deployment node is one of the multiple deployment nodes, and a deployment node to which the management server delivers the first deployment instruction may be considered as the target deployment node.

For example, it is assumed that the multiple deployment nodes are the deployment nodes in the application deployment model diagram shown in FIG. 1.1. In this case, the target deployment node may be any one of V1, V2, V3, V4, or V5. It is assumed that the management server delivers the first deployment instruction to V4. In this case, V4 may be considered as the target deployment node.

The first deployment instruction is used to instruct to deploy an application such as a Docker container application management system application or a Guestbook application.

In one embodiment, the first deployment instruction may carry a hierarchical relationship between the target deployment node and another deployment node, and a correspondence between an application component of the application and a deployment node included in the hierarchical relationship. Alternatively, the first deployment instruction may carry an application identifier of the application.

In operation 202, the target deployment node determines a kinship node of the target deployment node according to the first deployment instruction, where the kinship node includes a parent node, and determines, according to the first deployment instruction, a second application component that is in multiple application components and that corresponds to the parent node.

It should be noted that because there is a dependency (that is, a parent-child relationship) between deployment nodes, that is, there is a dependency between to-be-installed application components on the deployment nodes, the to-be-installed application components need to be installed according to a specific sequence. Therefore, before deploying an application component, each deployment node needs to determine whether the deployment node has a parent node and whether the parent node has deployed an application component. Deployment of an application component on each deployment node depends on deployment of an application component on a parent node of the deployment node. That is, the deployment node can deploy an application component only when the parent node of the deployment node has deployed an application component. Therefore, after receiving the first deployment instruction sent by the management server, and before deploying the first application component, the target deployment node first needs to determine the kinship node of the target deployment node according to the first deployment instruction, where the kinship node includes the parent node, and determine, according to the first deployment instruction, the second application component that is in the multiple application components and that corresponds to the parent node.

In one embodiment, the target deployment node determines a kinship node of the target deployment node according to the first deployment instruction, where the kinship node includes a parent node, and determines, according to the first deployment instruction, a second application component that is in multiple application components and that corresponds to the parent node includes:

parsing, by the target deployment node, the first deployment instruction, so as to obtain a hierarchical relationship between the target deployment node and another deployment node, and a correspondence between an application component of the application and a deployment node included in the hierarchical relationship; and determining, by the target deployment node, the parent node of the target deployment node according to the hierarchical relationship, and determining, according to the correspondence, the second application component that is in the multiple application components and that corresponds to the parent node.

In this embodiment, the first deployment instruction carries the hierarchical relationship between the target deployment node and another deployment node, and the correspondence between an application component of the application and a deployment node included in the hierarchical relationship. In this way, the target deployment node may parse the first deployment instruction and directly extract the hierarchical relationship and the correspondence, determine the parent node of the target deployment node according to the hierarchical relationship, and determine, according to the correspondence, the second application component that is in the multiple application components and that corresponds to the parent node.

The hierarchical relationship and the correspondence may be presented in a form of an application deployment model diagram (for example, the application deployment model diagram shown in FIG. 1.1). The application deployment model diagram is a deployment model diagram of the application. The application deployment model diagram may exist in the first deployment instruction. Alternatively, the hierarchical relationship and the correspondence may exist in the first deployment instruction in a form of a data packet or a frame.

As another optional implementation, the first deployment instruction carries an application identifier of the application, and that the target deployment node determines a kinship node of the target deployment node according to the first deployment instruction, where the kinship node includes a parent node, and determines, according to the first deployment instruction, a second application component that is in multiple application components and that corresponds to the parent node includes:

sending, by the target deployment node to a storage server, a deployment relationship obtaining request that carries the application identifier, where the deployment relationship obtaining request is used to request to obtain a deployment relationship of the application;

receiving, by the target deployment node, the deployment relationship that is of the application and that is sent by the storage server in response to the deployment relationship obtaining request, where the deployment relationship of the application includes a hierarchical relationship between the target deployment node and another deployment node, and a correspondence between an application component of the application and a deployment node included in the hierarchical relationship; and determining, by the target deployment node, the parent node of the target deployment node according to the hierarchical relationship, and determining, according to the correspondence, the second application component that is in the multiple application components and that corresponds to the parent node.

In this embodiment, the storage server pre-stores the deployment relationship of the application. The deployment relationship of the application includes the hierarchical relationship between the target deployment node and another deployment node, and the correspondence between an application component of the application and a deployment node included in the hierarchical relationship. After receiving the first deployment instruction, the target deployment node may obtain, from the storage server, the hierarchical relationship between the target deployment node and another deployment node, and the correspondence between an application component of the application and a deployment node included in the hierarchical relationship. In this way, the target deployment node may determine the parent node of the target deployment node according to the hierarchical relationship, and determine, according to the correspondence, the second application component that is in the multiple application components and that corresponds to the parent node.

In one embodiment, if the parent node of the target deployment node is a virtual start node, a system considers, by default, that a deployment status of the virtual start node is deployment completion, and the target deployment node that depends on the virtual start node may directly perform operation 204.

In operation 203, the target deployment node sends a second deployment instruction to the parent node.

The second deployment instruction is used to instruct the parent node to deploy the second application component.

After receiving the second deployment instruction sent by the target deployment node, the parent node may obtain an application software package of the second application component from the storage server, and use the application software package to deploy the second application component.

It should be noted that after receiving the second deployment instruction sent by the target deployment node, the parent node needs to determine, according to the second deployment instruction, whether the parent node has a parent node of the parent node and whether the parent node of the parent node has deployed an application component. If the parent node has a parent node and the parent node of the parent node has not deployed an application component, the parent node of the target deployment node needs to wait and can deploy an application component only after the parent node of the parent node finishes deploying an application component.

In this optional implementation 204. When detecting that the parent node has deployed the second application component, the target deployment node deploys a first application component according to the first deployment instruction.

The first application component is an application component that is in the multiple application components and that corresponds to the target deployment node.

In this embodiment of the present invention, each deployment node may record, in the storage server, a deployment status of an application component deployed on the deployment node, so that another deployment node can detect, from the storage server in real time, a deployment status of an application component on any deployment node, and perform application component deployment according to a deployment status of an application component on a deployment node. The deployment status may include but is not limited to a non-deployed state, an under deployment state, a deployment completion state, a deployment failure state, and a fault state.

After finishing deploying the second application component, the parent node may update a deployment status of the second application component to a deployment completion state.

In one embodiment, the target deployment node may query, from the storage server, a deployment status of an application component on the parent node, and if it is found that the deployment status of the application component on the parent node is deployment completion, may determine that the parent node has deployed the second application component.

In one embodiment, after application component deployment on the parent node is completed, the parent node may proactively notify the target deployment node. In this way, the target deployment node may also determine that the parent node has deployed the second application component.

When detecting that the parent node has deployed the second application component, the target deployment node may determine the first application component according to the correspondence between an application component of the application and a deployment node included in the hierarchical relationship, obtain an application software package of the first application component from a software server, and use the application software package of the first application component to deploy the first application component.

In one embodiment, after finishing deploying the first application component, the target deployment node may update the deployment status of the first application component to a deployment completion state.

In operation 205, the target deployment node determines, according to the first deployment instruction, a third application component that is in the multiple application components and that corresponds to a brother node.

In one embodiment, a manner in which the target deployment node determines, according to the first deployment instruction, a third application component that is in the multiple application components and that corresponds to a brother node is specifically:

parsing, by the target deployment node, the first deployment instruction, so as to obtain a hierarchical relationship between the target deployment node and another deployment node, and a correspondence between an application component of the application and a deployment node included in the hierarchical relationship; and determining, by the target deployment node, the brother node of the target deployment node according to the hierarchical relationship, and determining, according to the correspondence, the third application component that is in the multiple application components and that corresponds to the brother node.

In one embodiment, the first deployment instruction carries an application identifier of the application, and a manner in which the target deployment node determines, according to the first deployment instruction, a third application component that is in the multiple application components and that corresponds to a brother node is specifically:

sending, by the target deployment node to a storage server, a deployment relationship obtaining request that carries the application identifier, where the deployment relationship obtaining request is used to request to obtain a deployment relationship of the application;

receiving, by the target deployment node, the deployment relationship that is of the application and that is sent by the storage server in response to the deployment relationship obtaining request, where the deployment relationship of the application includes a hierarchical relationship between the target deployment node and another deployment node, and a correspondence between an application component of the application and a deployment node included in the hierarchical relationship; and determining, by the target deployment node, the brother node of the target deployment node according to the hierarchical relationship, and determining, according to the correspondence, the third application component that is in the multiple application components and that corresponds to the brother node.

In operation 206, when detecting that the parent node has deployed the second application component, the target deployment node sends a third deployment instruction to the brother node.

The third deployment instruction is used to instruct the brother node to deploy the third application component.

After receiving the third deployment instruction sent by the target deployment node, the brother node may obtain an application software package of the third application component from the storage server, and use the application software package to deploy the third application component.

It should be noted that after receiving the third deployment instruction sent by the target deployment node, the brother node needs to determine, according to the third deployment instruction, whether the brother node has a parent node of the brother node and whether the parent node of the brother node has deployed an application component. If the brother node has a parent node and the parent node of the brother node has not deployed an application component, the brother node needs to wait and can deploy an application component only after the parent node of the brother node finishes deploying an application component.

After finishing deploying the third application component, the brother node may update a deployment status of the third application component to a deployment completion state.

In one embodiment, when detecting that the parent node has deployed the second application component, the target deployment node may first detect whether the brother node has deployed an application component. If the brother node has not deployed an application component, the target deployment node may send the third deployment instruction to the brother node, or if the brother node has deployed an application component, the target deployment node does not need to send the third deployment instruction to the brother node. In this way, system resources can be saved.

In operation 207, the target deployment node determines, according to the first deployment instruction, a fourth application component that is in the multiple application components and that corresponds to a child node.

A manner of determining, by the target deployment node according to the first deployment instruction, the fourth application component that is in the multiple application components and that corresponds to the child node is similar to the foregoing method, and details are not described herein again.

After deploying the first application component according to the first deployment instruction, the target deployment node may determine, according to the first deployment instruction, the fourth application component that is in the multiple application components and that corresponds to the child node.

In operation 208, the target deployment node sends a fourth deployment instruction to the child node.

The fourth deployment instruction is used to instruct the child node to deploy the fourth application component.

After receiving the fourth deployment instruction sent by the target deployment node, the child node may obtain, from the storage server, an application software package of the fourth application component, and use the application software package to deploy the fourth application component.

After finishing deploying the fourth application component, the child node may update a deployment status of the fourth application component to a deployment completion state.

It should be noted that after receiving the fourth deployment instruction sent by the target deployment node, the child node needs to determine, according to the fourth deployment instruction, whether the child node has a parent node of the child node and whether the parent node of the child node has deployed an application component. If the child node has a parent node and the parent node of the child node has not deployed an application component, the child node needs to wait and can deploy an application component only after the parent node of the child node finishes deploying an application component.

In one embodiment, when detecting that the parent node has deployed the second application component, the target deployment node may first detect whether the child node has deployed an application component. If the child node has not deployed an application component, the target deployment node may send the fourth deployment instruction to the child node, or if the child node has deployed an application component, the target deployment node does not need to send the fourth deployment instruction to the child node. In this way, system resources can be saved.

An installation sequence of application components on the deployment nodes may be learned from the foregoing description. That is, the parent node of the target deployment node first finishes application component installation, then the target deployment node finishes application component installation, and finally the brother node/the child node of the target deployment node finishes application component installation.

Descriptions are given in the following with reference to FIG. 1.1.

It is assumed that the target deployment node is V4 in FIG. 1.1, and the application deployment model diagram is the application deployment model diagram shown in FIG. 1.1. After receiving the deployment instruction that is sent by the management server and that is used to instruct to deploy an application, and obtaining the application deployment model diagram shown in FIG. 1.1, V4 detects, according to the application deployment model diagram shown in FIG. 1.1, whether V4 has a parent node. It can be seen from FIG. 1.1 that V1 and V2 are parent nodes of V4. After detecting, according to the application deployment model diagram shown in FIG. 1.1, that V1 and V2 are the parent nodes of V4, V4 detects, from the storage server, that deployment statuses of application components on V1 and V2 are both uninstalled states, and V4 may separately send, to V1 and V2, a deployment instruction that is used to instruct to deploy an application component. After receiving the deployment instruction, further, V1 detects, according to the application deployment model diagram shown in FIG. 1.1, whether V1 has a parent node. It can be seen from the application deployment model diagram shown in FIG. 1.1 that V0 is a parent node of V1. V0 is the virtual start node, and the system considers, by default, that a deployment status of an application component on V0 is installation completion. Therefore, V1 may directly obtain, from the software server, an application software package of an application component corresponding to V1, and perform an application component deployment operation. After the application component corresponding to V1 is deployed, V1 updates, on the storage server, a deployment status of the application component on V1 to an installation completion state.

Similarly, after receiving the deployment instruction, further, V2 detects, according to the application deployment model diagram shown in FIG. 1.1, whether V2 has a parent node. It can be seen from the application deployment model diagram shown in FIG. 1.1 that V0 is a parent node of V2. Therefore, V2 may directly obtain, from the software server, an application software package of an application component corresponding to V2, and perform an application component deployment operation. After the application component corresponding to V2 is deployed, V2 updates, on the storage server, a deployment status of the application component on V2 to an installation completion state.

After detecting that the deployment statuses of the application components on V1 and V2 are deployment completion, V4 may obtain an application software package of an application component corresponding to V4, and perform an application component deployment operation. After deployment is completed, V4 updates, on the storage server, a deployment status of an application component on V4 to an installation completion state.

In addition, after application component deployment on V1 is completed, V1 may detect, according to the application deployment model diagram shown in FIG. 1.1, whether V1 has a brother node or a child node. Similarly, after application component deployment on V2 is completed, V2 may detect, according to the application deployment model diagram shown in FIG. 1.1, whether V2 has a brother node or a child node. It can be seen from the application deployment model diagram shown in FIG. 1.1 that V1, V2, and V3 are brother nodes of each other, and V5 is a child node of V2. In one embodiment, regardless of which deployment status an application component on V3 is in, V1 and V2 may send, to V3, a deployment instruction that is used to instruct to deploy an application component, and V2 may further send, to V5, a deployment instruction that is used to instruct to deploy an application component. In one embodiment, after application component deployment on V1 or V2 is completed, V1 or V2 may first detect a deployment status of an application component on V3. If the deployment status of the application component on V3 is an uninstalled state, V1 or V2 further sends, to V3, a deployment instruction that is used to instruct to deploy an application component. If the deployment status of the application component on V3 is deployment completion, V1 or V2 does not need to send, to V3, a deployment instruction that is used to instruct to deploy an application component. This may avoid repeatedly sending a deployment instruction to V3, so as to save system resources.

After receiving the deployment instruction that is used to instruct to deploy an application component, and obtaining the application deployment model diagram shown in FIG. 1.1, V3 detects that the virtual start node V0 is a parent node of V3, directly obtains an application software package of an application component corresponding to V3, and further performs an application component deployment operation. After deployment on V3 is completed, V3 updates, on the storage server, a deployment status of the application component on V3 to a deployment completion state. Further, when detecting that V3 has no brother node or child node, V3 does not need to perform any operation.

After receiving the deployment instruction that is used to instruct to deploy an application component, and obtaining the application deployment model diagram shown in FIG. 1.1, V5 detects that a parent node V2 on which V5 depends has finished deploying an application component, and V5 directly obtains an application software package of an application component corresponding to V5 and further performs an application component deployment operation. After finishing deployment, V5 updates, on the storage server, a deployment status of the application component on V5 to a deployment completion state. Further, V5 detects that a brother node V4 of V5 has finished deploying an application component, and V5 has no child node. In this case, V5 does not need to perform any operation.

Now, all the deployment nodes shown in FIG. 1.1 finish application component deployment, that is, deployment of an entire application is completed. It may be learned from the foregoing description that V4 first receives the deployment instruction sent by the management server, and obtains the application deployment model diagram; the parent node V1/V2 of V4 first performs an application component deployment operation; and after application component deployment on V1/V2 is completed, V3, V4, or V5 performs application component deployment at the same time.

It may be learned that in an entire application deployment process, dependence of a deployment node on a server is reduced, and multiple deployment nodes may flexibly perform an application component deployment operation. This may not only simplify service logic of a cloud platform application deployment system, and enhance a capability of concurrently deploying applications in the cloud platform application deployment system, but also improve application deployment efficiency.

After application deployment is completed, the application may normally run. However, in a subsequent application running process, an application component may become faulty, or an application component may need to be upgraded. For these cases, a deployment node may autonomously perform a corresponding operation, so as to reduce dependence on a server.

In one embodiment, the method further includes:

(11) when the first application component becomes faulty during running, updating, by the target deployment node, a deployment status of the first application component to a fault state;

(12) re-deploying, by the target deployment node, the first application component; and

(13) after finishing re-deploying the first application component, updating, by the target deployment node, the deployment status of the first application component to a deployment completion state.

In this embodiment, after application deployment is completed, in a subsequent running process, the first application component of the target deployment node may become faulty during running. The first application component becomes faulty during running mainly due to two causes. The first cause is that the target deployment node on which the first application component is deployed becomes faulty, and the second cause is that the first application component becomes faulty. The first case in which the target deployment node becomes faulty is not considered in the present invention, and the second case is mainly considered in the present invention.

Because there is kinship between deployment nodes, when the first application component becomes faulty during running, the target deployment node needs to update a deployment status of the first application component of the target deployment node to a fault state, so that another deployment node associated with the target deployment node obtains a deployment status of an application component of the target deployment node.

Further, the target deployment node may obtain, from the software server, an application software package of the first application component, and re-deploy the first application component. After finishing re-deploying the first application component, the target deployment node updates the deployment status of the first application component to a deployment completion state.

It may be learned that when the first application component becomes faulty during running, the target deployment node may automatically perform an application component re-deployment operation, thereby reducing dependence on a server, and implementing automatic fault recovery.

As another optional implementation, the method further includes:

(21) receiving, by the target deployment node, an upgrade instruction sent by the management server, where the upgrade instruction instructs the target deployment node to upgrade the first application component;

(22) updating, by the target deployment node, a deployment status of the first application component to a non-deployed state;

(23) performing, by the target deployment node, an upgrade operation on the first application component according to the upgrade instruction; and

(24) updating, by the target deployment node, a deployment status of the upgraded first application component to a deployment completion state.

In this embodiment, because a new function of a service goes online or a problem needs to be resolved, the first application component of the target deployment node may need to be upgraded. In this case, the first application component currently deployed on the target deployment node is not used any more, and it is considered, by default, that no upgraded application component is installed. Therefore, the deployment status of the first application component of the target deployment node needs to be updated to a non-deployed state, and the upgrade operation needs to be performed on the first application component according to an upgrade instruction. After the upgrade operation on the first application component of the target deployment node is completed, the deployment status of the upgraded first application component needs to be updated to a deployment completion state.

In the method process described in FIG. 2, after receiving the first deployment instruction sent by the management server, the target deployment node may instruct the parent node of the target deployment node to deploy an application component. Then the target deployment node may also deploy an application component. The target deployment node may further instruct the brother node and the child node of the target deployment node to deploy an application component. In the entire process, dependence on a server is reduced, and a deployment node may automatically deploy an application component, so as to improve flexibility of application component deployment.

Figure 3:
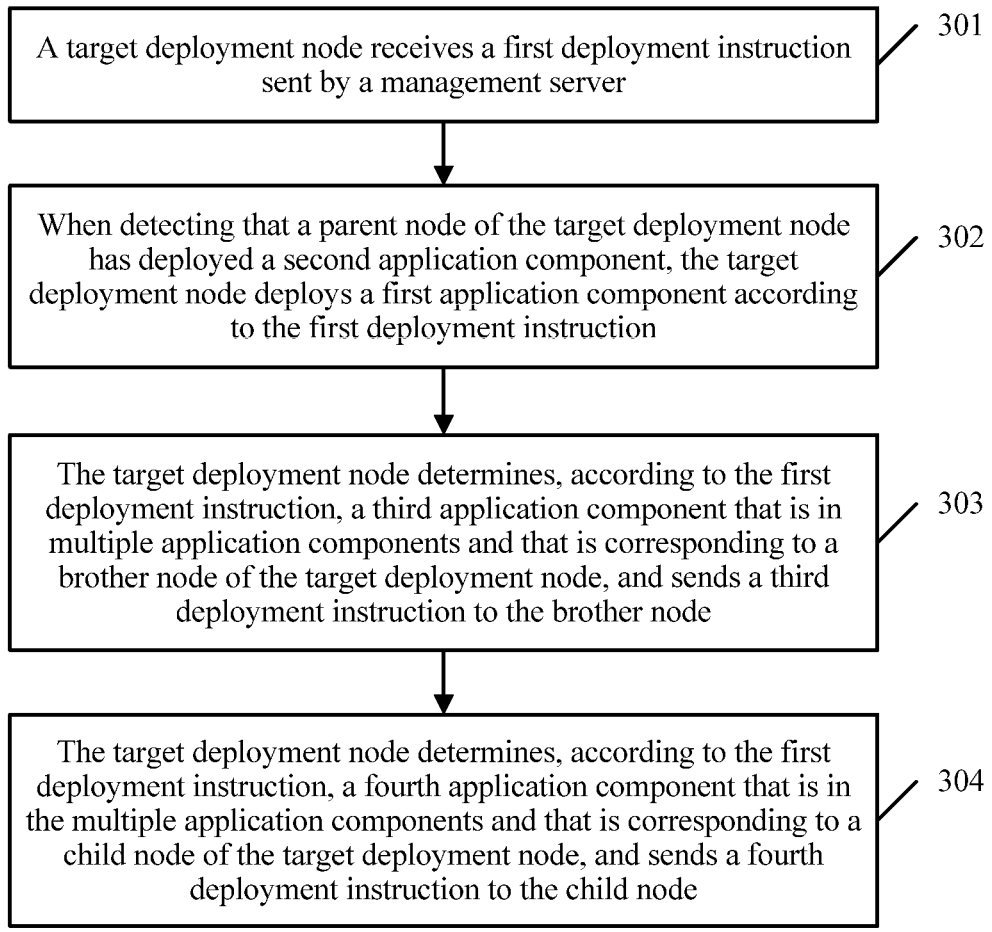
FIG. 3 is a schematic flowchart of another application component deployment method according to an embodiment of the present invention.

Referring to FIG. 3, FIG. 3 is a schematic flowchart of another application deployment method according to an embodiment of the present invention. The method is used for deploying, on multiple deployment nodes, multiple application components of an application. As shown in FIG. 3, the method includes the following operations.

In operation 301, a target deployment node receives a first deployment instruction sent by a management server.

The target deployment node is one of the multiple deployment nodes, and the first deployment instruction is used to instruct to deploy an application.

In operation 302, when detecting that a parent node of the target deployment node has deployed a second application component, the target deployment node deploys a first application component according to the first deployment instruction.

The first application component is an application component that is in the multiple application components and that corresponds to the target deployment node. The second application component is an application component that is in the multiple application components and that corresponds to the parent node.

In operation 303, the target deployment node determines, according to the first deployment instruction, a third application component that is in multiple application components and that corresponds to a brother node of the target deployment node, and sends a third deployment instruction to the brother node.

The third deployment instruction is used to instruct the brother node to deploy the third application component.

In one embodiment, that the target deployment node determines, according to the first deployment instruction, a third application component that is in multiple application components and that corresponds to a brother node of the target deployment node includes:

parsing, by the target deployment node, the first deployment instruction, so as to obtain a hierarchical relationship between the target deployment node and another deployment node, and a correspondence between an application component of the application and a deployment node included in the hierarchical relationship; and determining, by the target deployment node, the brother node of the target deployment node according to the hierarchical relationship, and determining, according to the correspondence, the third application component that is in the multiple application components and that corresponds to the brother node.

In one embodiment, the first deployment instruction carries an application identifier of the application, and that the target deployment node determines, according to the first deployment instruction, a third application component that is in multiple application components and that corresponds to a brother node of the target deployment node includes:

sending, by the target deployment node to a storage server, a deployment relationship obtaining request that carries the application identifier, where the deployment relationship obtaining request is used to request to obtain a deployment relationship of the application;

receiving, by the target deployment node, the deployment relationship that is of the application and that is sent by the storage server in response to the deployment relationship obtaining request, where the deployment relationship of the application includes a hierarchical relationship between the target deployment node and another deployment node, and a correspondence between an application component of the application and a deployment node included in the hierarchical relationship; and determining, by the target deployment node, the brother node of the target deployment node according to the hierarchical relationship, and determining, according to the correspondence, the third application component that is in the multiple application components and that corresponds to the brother node.

In operation 304, the target deployment node determines, according to the first deployment instruction, a fourth application component that is in the multiple application components and that corresponds to a child node of the target deployment node, and sends a fourth deployment instruction to the child node.

The fourth deployment instruction is used to instruct the child node to deploy the fourth application component.

A manner in which "the target deployment node determines, according to the first deployment instruction, a fourth application component that is in the multiple application components and that corresponds to a child node of the target deployment node" is similar to the manner in which "the target deployment node determines, according to the first deployment instruction, a third application component that is in multiple application components and that corresponds to a brother node of the target deployment node", and details are not described herein again.

In the method process described in FIG. 3, when detecting that the parent node of the target deployment node has deployed the second application component, the target deployment node may not need to wait, but directly deploy the first application component according to the first deployment instruction. At the same time, the target deployment node may further instruct the brother node and the child node of the target deployment node to deploy an application component. In the entire process, dependence on a server is reduced, and a deployment node may automatically deploy an application component, so as to improve flexibility of application component deployment.

Figure 4:
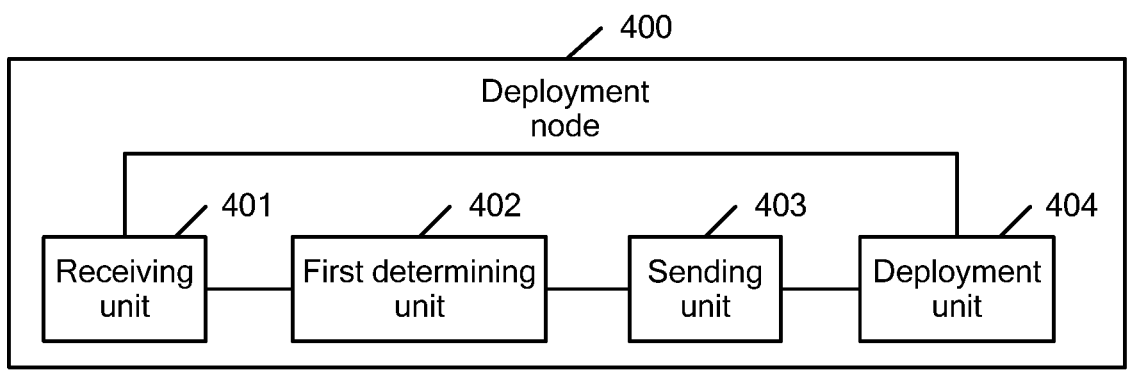
FIG. 4 is a schematic structural diagram of a deployment node according to an embodiment of the present invention.

Referring to FIG. 4, FIG. 4 is a schematic structural diagram of a deployment node according to an embodiment of the present invention. The deployment node may be configured to perform some or all of the operations of the method described in FIG. 2. For details, refer to the descriptions in FIG. 2, and details are not described herein again. As shown in FIG. 4, deployment node 400 may include:

a receiving unit 401, configured to receive a first deployment instruction sent by a management server, where the deployment node is one of multiple deployment nodes, and the first deployment instruction is used to instruct to deploy an application;

a first determining unit 402, configured to: determine a kinship node of the deployment node according to the first deployment instruction, where the kinship node includes a parent node, and determine, according to the first deployment instruction, a second application component that is in the multiple application components and that corresponds to the parent node;

a sending unit 403, configured to send a second deployment instruction to the parent node, where the second deployment instruction is used to instruct the parent node to deploy the second application component; and a deployment unit 404, configured to: when the deployment node detects that the parent node has deployed the second application component, deploy a first application component according to the first deployment instruction, where the first application component is an application component that is in the multiple application components and that corresponds to the deployment node.

Figure 5:
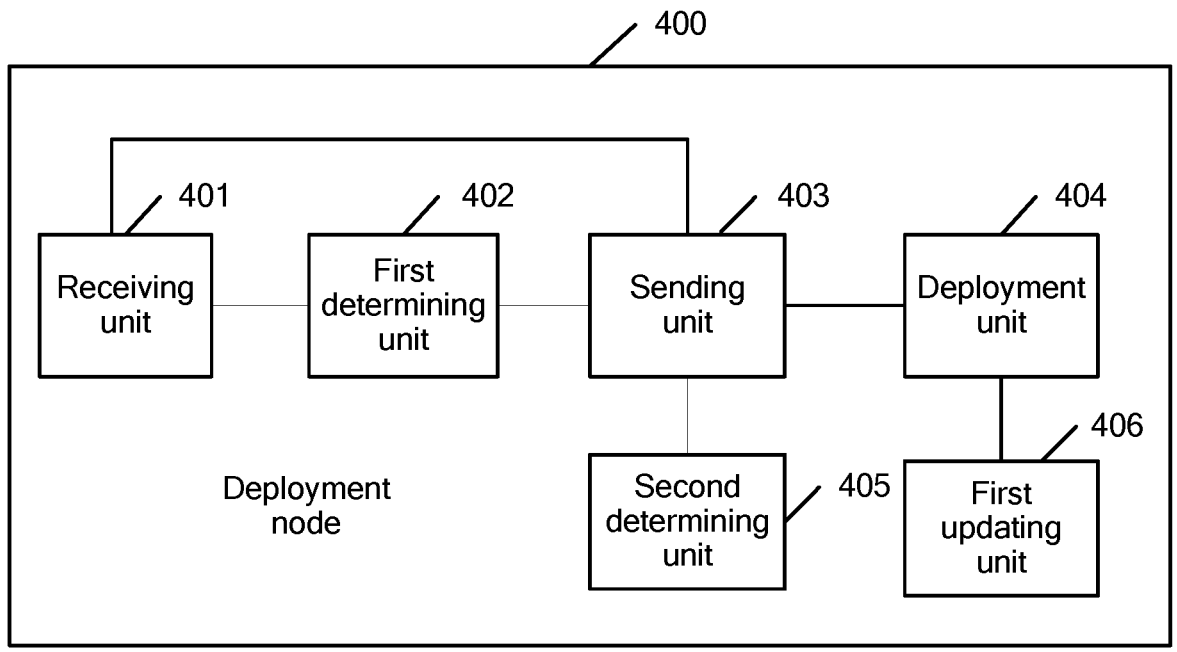
FIG. 5 is a schematic structural diagram of another deployment node according to an embodiment of the present invention.

Referring to FIG. 5, FIG. 5 is a schematic structural diagram of another deployment node according to an embodiment of the present invention. The deployment node may be configured to perform some or all of the operations of the method described in FIG. 2. For details, refer to the descriptions in FIG. 2, and details are not described herein again. The deployment node shown in FIG. 5 is obtained by further optimizing the deployment node shown in FIG. 4. In comparison between the deployment node shown in FIG. 5 and the deployment node shown in FIG. 4, the deployment node shown in FIG. 5 includes all the units of the deployment node shown in FIG. 4, and in addition, in the aspect of determining a kinship node of the deployment node according to the first deployment instruction, where the kinship node includes a parent node, and determining, according to the first deployment instruction, a second application component that is in the multiple application components and that corresponds to the parent node, the first determining unit 402 is specifically configured to:

parse the first deployment instruction, so as to obtain a hierarchical relationship between the deployment node and another deployment node, and a correspondence between an application component of the application and a deployment node included in the hierarchical relationship; and determine the parent node of the deployment node according to the hierarchical relationship, and determine, according to the correspondence, the second application component that is in the multiple application components and that corresponds to the parent node.

In one embodiment, the kinship node further includes a brother node, and the deployment node shown in FIG. 5 may further include:

a second determining unit 405, configured to determine, according to the first deployment instruction, a third application component that is in the multiple application components and that corresponds to the brother node, where the sending unit 403 is further configured to: when the deployment node detects that the parent node has deployed the second application component, send a third deployment instruction to the brother node, where the third deployment instruction is used to instruct the brother node to deploy the third application component.

In one embodiment, the deployment node shown in FIG. 5 may further include:

a first updating unit 406, configured to: when the first application component becomes faulty during running, update a deployment status of the first application component to a fault state, where the deployment unit 404 is further configured to re-deploy the first application component; and the first updating unit 406 is further configured to: after the deployment node finishes re-deploying the first application component, update the deployment status of the first application component to a deployment completion state.

Figure 6:
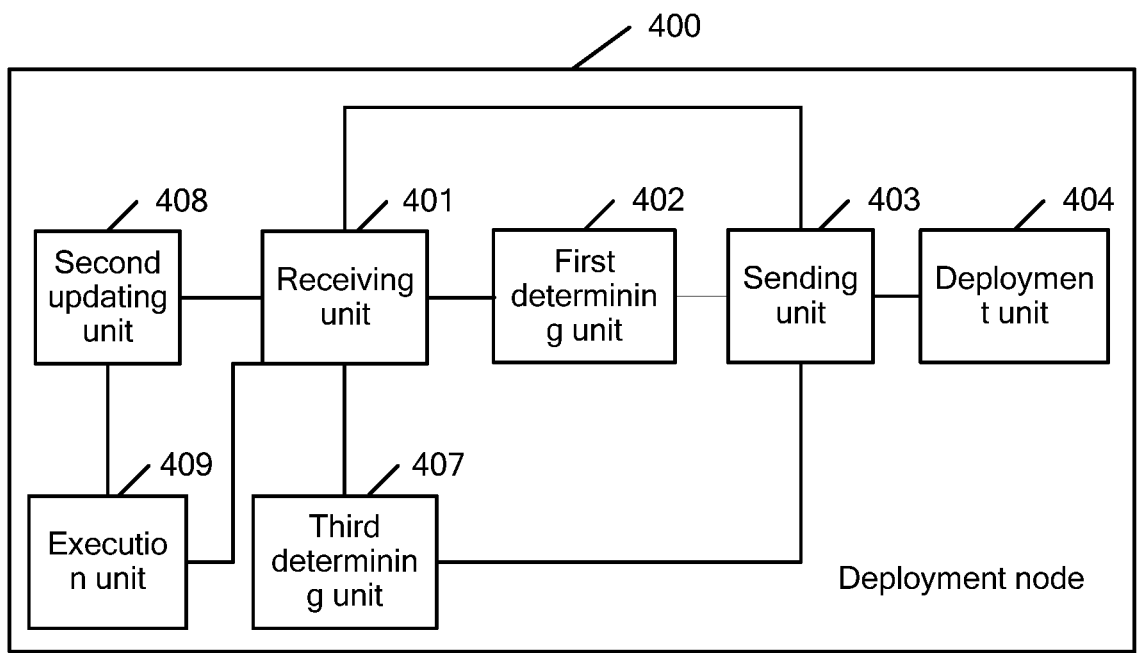
FIG. 6 is a schematic structural diagram of another deployment node according to an embodiment of the present invention.

Referring to FIG. 6, FIG. 6 is a schematic structural diagram of another deployment node according to an embodiment of the present invention. The deployment node may be configured to perform some or all of the operations of the method described in FIG. 2. For details, refer to the descriptions in FIG. 2, and details are not described herein again. The deployment node shown in FIG. 6 is obtained by further optimizing the deployment node shown in FIG. 4. In comparison between the deployment node shown in FIG. 6 and the deployment node shown in FIG. 4, the deployment node shown in FIG. 6 includes all the units of the deployment node shown in FIG. 4, and in addition, the first deployment instruction carries an application identifier of the application, and in the aspect of determining a kinship node of the target deployment node according to the first deployment instruction, where the kinship node includes a parent node, and determining, according to the first deployment instruction, a second application component that is in the multiple application components and that corresponds to the parent node, the first determining unit 402 is specifically configured to:

send, to a storage server by using the sending unit 403, a deployment relationship obtaining request that carries the application identifier, where the deployment relationship obtaining request is used to request to obtain a deployment relationship of the application;

receive, by using the receiving unit 401, the deployment relationship that is of the application and that is sent by the storage server in response to the deployment relationship obtaining request, where the deployment relationship of the application includes a hierarchical relationship between the deployment node and another deployment node, and a correspondence between an application component of the application and a deployment node included in the hierarchical relationship; and determine the parent node of the deployment node according to the hierarchical relationship, and determine, according to the correspondence, the second application component that is in the multiple application components and that corresponds to the parent node.

In one embodiment, the kinship node further includes a child node, and after the deployment unit 404 deploys a first application component according to the first deployment instruction, the deployment node shown in FIG. 6 may further include:

a third determining unit 407, configured to determine, according to the first deployment instruction, a fourth application component that is in the multiple application components and that corresponds to the child node, where the sending unit 403 is further configured to send a fourth deployment instruction to the child node, where the fourth deployment instruction is used to instruct the child node to deploy the fourth application component.

In one embodiment, the receiving unit 401 is further configured to receive an upgrade instruction sent by the management server, where the upgrade instruction instructs the deployment node to upgrade the first application component.

The deployment node shown in FIG. 6 may further include:

a second updating unit 408, configured to update a deployment status of the first application component to a non-deployed state; and an execution unit 409, configured to perform an upgrade operation on the first application component according to the upgrade instruction, where the second updating unit 408 is further configured to update a deployment status of the upgraded first application component to a deployment completion state.

In the deployment node 400 described in FIG. 4 to FIG. 6, in an entire application deployment process, dependence of a deployment node on a server is reduced, and the deployment node may automatically deploy an application component, so as to improve flexibility of application component deployment.

Figure 7:
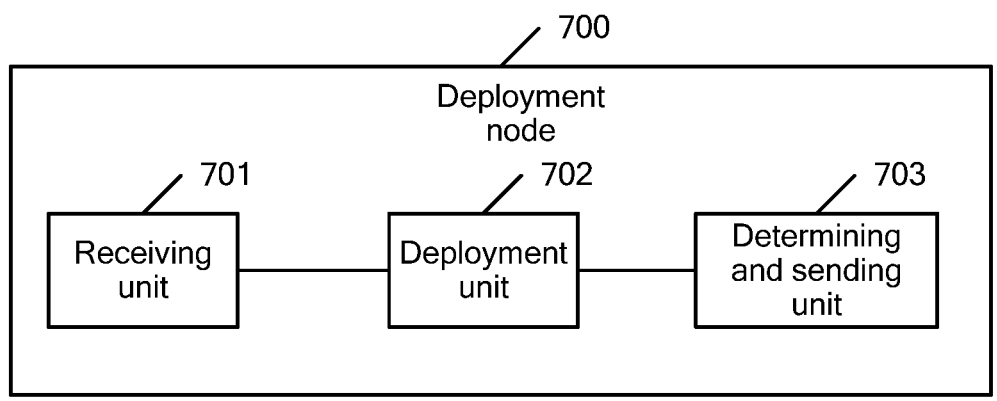
FIG. 7 is a schematic structural diagram of another deployment node according to an embodiment of the present invention.

Referring to FIG. 7, FIG. 7 is a schematic structural diagram of another deployment node according to an embodiment of the present invention. The deployment node may be configured to perform some or all of the operations of the method described in FIG. 3. For details, refer to the descriptions in FIG. 3, and details are not described herein again. As shown in FIG. 7, deployment node 700 may include:

a receiving unit 701, configured to receive a first deployment instruction sent by a management server, where the deployment node is one of the multiple deployment nodes, and the first deployment instruction is used to instruct to deploy an application;

a deployment unit 702, configured to: when the deployment node detects that a parent node of the deployment node has deployed a second application component, deploy a first application component according to the first deployment instruction, where the first application component is an application component that is in the multiple application components and that corresponds to the deployment node, and the second application component is an application component that is in the multiple application components and that corresponds to the parent node;

a determining and sending unit 703, configured to: determine, according to the first deployment instruction, a third application component that is in the multiple application components and that corresponds to a brother node of the deployment node, and send a third deployment instruction to the brother node, where the third deployment instruction is used to instruct the brother node to deploy the third application component; or configured to: determine, according to the first deployment instruction, a fourth application component that is in the multiple application components and that corresponds to a child node of the deployment node, and send a fourth deployment instruction to the child node, where the fourth deployment instruction is used to instruct the child node to deploy the fourth application component.

In one embodiment, in the aspect of determining, according to the first deployment instruction, a third application component that is in the multiple application components and that corresponds to a brother node of the deployment node, the determining and sending unit 703 is specifically configured to:

parse the first deployment instruction, so as to obtain a hierarchical relationship between the deployment node and another deployment node, and a correspondence between an application component of the application and a deployment node included in the hierarchical relationship; and determine the brother node of the deployment node according to the hierarchical relationship, and determine, according to the correspondence, the third application component that is in the multiple application components and that corresponds to the brother node.

In one embodiment, the first deployment instruction carries an application identifier of the application, and in the aspect of determining, according to the first deployment instruction, a third application component that is in the multiple application components and that corresponds to a brother node of the deployment node, the determining and sending unit 703 is specifically configured to:

send, to a storage server, a deployment relationship obtaining request that carries the application identifier, where the deployment relationship obtaining request is used to request to obtain a deployment relationship of the application;

receive, by using the receiving unit 701, deployment relationship that is of the application and that is sent by the storage server in response to the deployment relationship obtaining request, where the deployment relationship of the application includes a hierarchical relationship between the deployment node and another deployment node, and a correspondence between an application component of the application and a deployment node included in the hierarchical relationship; and determine the brother node of the deployment node according to the hierarchical relationship, and determine, according to the correspondence, the third application component that is in the multiple application components and that corresponds to the brother node.

In the deployment node described in FIG. 7, in an entire application deployment process, dependence of a deployment node on a server is reduced, and the deployment node may automatically deploy an application component, so as to improve flexibility of application component deployment.

It should be noted that the units described in FIG. 4 to FIG. 7 may be processes, or may be threads. In addition, the foregoing units are divided as an example. Some units may be one unit. For example, the first determining unit 402, the second determining unit 405, and the third determining unit 407 may be one unit; and the first updating unit 406 and the second updating unit 408 may be one unit. This is not limited in this embodiment of the present invention.

Figure 8:
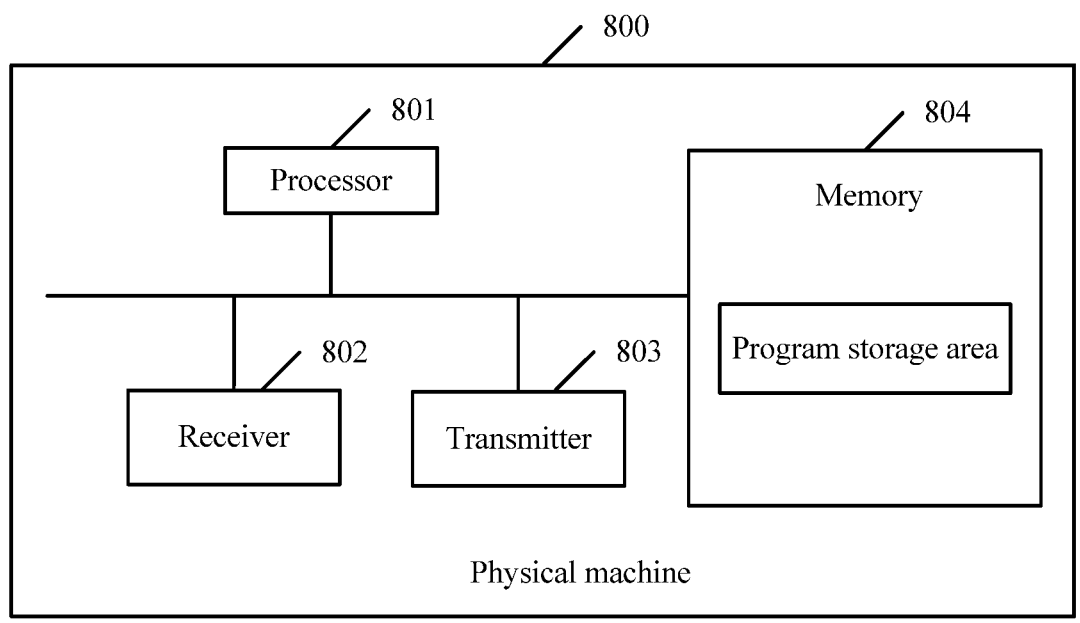
FIG. 8 is a schematic structural diagram of a physical machine according to an embodiment of the present invention.

In addition, in one implementation, in the foregoing units described in FIG. 4 to FIG. 6, the receiving unit 401 may be implemented by a receiver 802 in FIG. 8; the sending unit 403 may be implemented by the transmitter 803 in FIG. 8; and the first determining unit 402, the deployment unit 404, the second determining unit 405, the first updating unit 406, the third determining unit 407, the second updating unit 408, and the execution unit 409 may be implemented by a processor 801 in FIG. 8.

Figure 9:
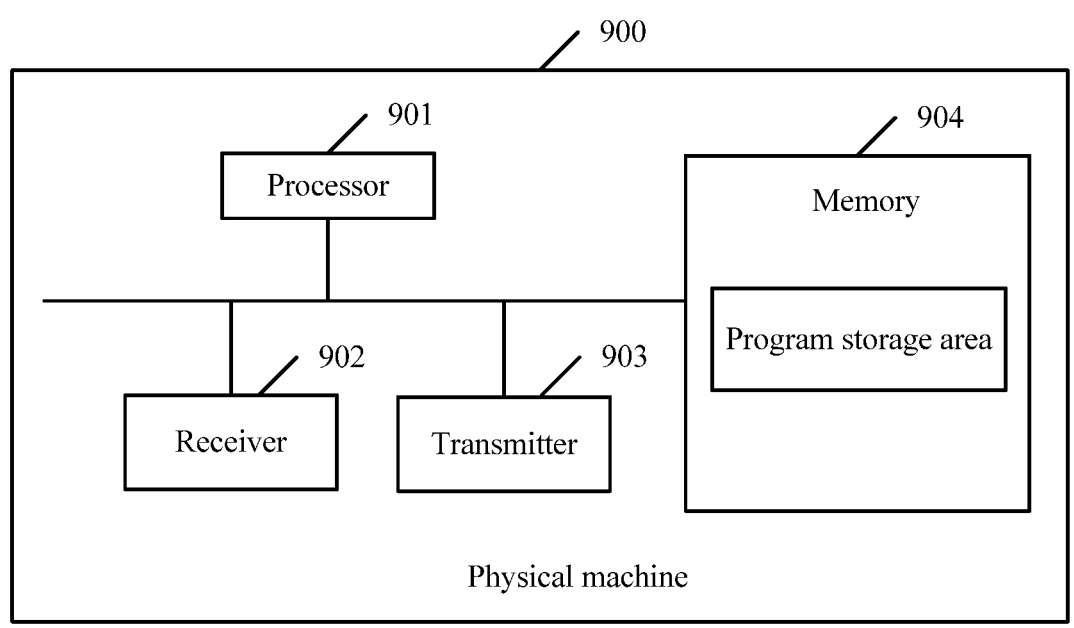
FIG. 9 is a schematic structural diagram of another physical machine according to an embodiment of the present invention.

In the units described in FIG. 7, the receiving unit 701 may be implemented by a receiver 902 in FIG. 9; the deployment unit 702 may be implemented by a processor 901 in FIG. 9; and the determining and sending unit 703 may be implemented by the transmitter 903 in FIG. 9.

Referring to FIG. 8, FIG. 8 is a schematic structural diagram of a physical machine according to an embodiment of the present invention. Multiple deployment nodes are deployed on physical machine 800, and may be configured to perform all or some of the operations of the application component deployment method disclosed in FIG. 2. For details, refer to the descriptions in FIG. 2, and details are not described herein again. As shown in FIG. 8, the physical machine 800 may include: at least one processor 801, for example, a CPU (Central Processing Unit, central processing unit), at least one receiver 802, at least one transmitter 803, and a memory 804. The processor 801, the receiver 802, the transmitter 803, and the memory 804 are separately connected to a communications bus. In one embodiment, the receiver 802 and the transmitter 803 may be integrated together, for example, as a transceiver. The transceiver may be at least one of an antenna, a communications interface, or the like. A person skilled in the art should understand that the receiver and the transmitter are used for exchanging information between deployment nodes, between a deployment node and a storage server, or between a deployment node and a management server. Different purposes need different specific forms. For example, if a deployment node and a parent node of the deployment node are deployed on a same physical machine, at least one transmitter 803 may include an interface that is used for mutual communication between virtual machines or containers, such as a communications interface or a program interface. If a deployment node and a parent node of the deployment node are deployed on different physical machines, the at least one transmitter 803 may include a hardware device such as an antenna. For the receiver, examples are not listed herein.

The memory 804 may be a high-speed RAM memory, or may be a non-volatile memory (non-volatile memory). A person skilled in the art may understand that the structure of the physical machine 800 shown in FIG. 8 does not constitute a limitation on the present invention. The structure may be a bus structure or may be a star structure; and may further include more or fewer components than those shown in FIG. 8, or combine some parts, or have different parts arrangements.

The processor 801 is a control center of the physical machine 800, and may be a central processing unit (Central Processing Unit, CPU). The processor 801 is connected to all parts of the entire physical machine 800 by using various interfaces and lines, and is configured to perform the following operations by running or executing a software program and/or a module stored in the memory 804, and invoking program code stored in the memory 804:

receiving, by using the receiver 802, a first deployment instruction sent by a management server, where the deployment node is one of multiple deployment nodes, and the first deployment instruction is used to instruct to deploy an application;

determining a kinship node of the deployment node according to the first deployment instruction, where the kinship node includes a parent node, and determining, according to the first deployment instruction, a second application component that is in the multiple application components and that corresponds to the parent node;

sending a second deployment instruction to the parent node by using the transmitter 803, where the second deployment instruction is used to instruct the parent node to deploy the second application component; and when the deployment node detects that the parent node has deployed the second application component, deploying a first application component according to the first deployment instruction, where the first application component is an application component that is in the multiple application components and that corresponds to the deployment node.

In one embodiment, in the aspect of determining a kinship node of the deployment node according to the first deployment instruction, where the kinship node includes a parent node, and determining, according to the first deployment instruction, a second application component that is in the multiple application components and that corresponds to the parent node, the processor 801 is specifically configured to:

parse the first deployment instruction, so as to obtain a hierarchical relationship between the deployment node and another deployment node, and a correspondence between an application component of the application and a deployment node included in the hierarchical relationship; and determine the parent node of the deployment node according to the hierarchical relationship, and determine, according to the correspondence, the second application component that is in the multiple application components and that corresponds to the parent node.

In one embodiment, the first deployment instruction carries an application identifier of the application, and in the aspect of determining a kinship node of the deployment node according to the first deployment instruction, where the kinship node includes a parent node, and determining, according to the first deployment instruction, a second application component that is in the multiple application components and that corresponds to the parent node, the processor 801 is specifically configured to:

send, to a storage server by using the transmitter 803, a deployment relationship obtaining request that carries the application identifier, where the deployment relationship obtaining request is used to request to obtain a deployment relationship of the application;

receive, by using the receiver 802, the deployment relationship that is of the application and that is sent by the storage server in response to the deployment relationship obtaining request, where the deployment relationship of the application includes a hierarchical relationship between the deployment node and another deployment node, and a correspondence between an application component of the application and a deployment node included in the hierarchical relationship; and determine the parent node of the deployment node according to the hierarchical relationship, and determine, according to the correspondence, the second application component that is in the multiple application components and that corresponds to the parent node.

In one embodiment, the kinship node further includes a brother node, and the processor 801 is further configured to perform the following operations:

determining, according to the first deployment instruction, a third application component that is in the multiple application components and that corresponds to the brother node; and when the deployment node detects that the parent node has deployed the second application component, sending a third deployment instruction to the brother node by using the transmitter 803, where the third deployment instruction is used to instruct the brother node to deploy the third application component.

In one embodiment, the kinship node further includes a child node, and after the deploying a first application component according to the first deployment instruction, the processor 801 is further configured to perform the following operations:

determining, according to the first deployment instruction, a fourth application component that is in the multiple application components and that corresponds to the child node; and sending a fourth deployment instruction to the child node by using the transmitter 803, where the fourth deployment instruction is used to instruct the child node to deploy the fourth application component.

As an optional implementation, the processor 801 is further configured to perform the following operations:

when the first application component becomes faulty during running, updating a deployment status of the first application component to a fault state;

re-deploying the first application component; and after the deployment node finishes re-deploying the first application component, updating the deployment status of the first application component to a deployment completion state.

As another optional implementation, the processor 801 is further configured to perform the following operations:

receiving, by using the receiver 802, an upgrade instruction sent by the management server, where the upgrade instruction instructs the deployment node to upgrade the first application component;

updating a deployment status of the first application component to a non-deployed state;

performing an upgrade operation on the first application component according to the upgrade instruction; and updating a deployment status of the upgraded first application component to a deployment completion state.

In the physical machine 800 described in FIG. 8, after receiving the first deployment instruction sent by the management server, the deployment node may instruct the parent node of the deployment node to deploy an application component. Then the deployment node may also deploy an application component. The deployment node may further instruct the brother node and the child node of the deployment node to deploy an application component. In an entire process, dependence on a server is reduced, and a deployment node may automatically deploy an application component, so as to improve flexibility of application component deployment.

Referring to FIG. 9, FIG. 9 is a schematic structural diagram of another physical machine according to an embodiment of the present invention. Multiple deployment nodes are deployed on physical machine 900, and may be configured to perform all or some of the operations of the application component deployment method disclosed in FIG. 3. For details, refer to the descriptions in FIG. 3, and details are not described herein again. As shown in FIG. 9, the physical machine 900 may include: at least one processor 901, for example, a CPU (Central Processing Unit, central processing unit), at least one receiver 902, at least one transmitter 903, and a memory 904. The processor 901, the receiver 902, the transmitter 903, and the memory 904 are separately connected to a communications bus. In one embodiment, the receiver 902 and the transmitter 903 may be integrated together, for example, as a transceiver. The transceiver may be at least one of an antenna, a communications interface, or the like. A person skilled in the art should understand that the receiver and the transmitter are used for exchanging information between deployment nodes, between a deployment node and a storage server, or between a deployment node and a management server. Different purposes need different specific forms. For example, if a deployment node and a parent node of the deployment node are deployed on a same physical machine, at least one transmitter 903 may include an interface that is used for mutual communication between virtual machines or containers, such as a communications interface or a program interface. If a deployment node and a parent node of the deployment node are deployed on different physical machines, the at least one transmitter 903 may include a hardware device such as an antenna. For the receiver, examples are not listed herein.

The memory 904 may be a high-speed RAM memory, or may be a non-volatile memory (non-volatile memory). A person skilled in the art may understand that the structure of the physical machine 900 shown in FIG. 9 does not constitute a limitation on the present invention. The structure may be a bus structure or may be a star structure; and may further include more or fewer components than those shown in FIG. 9, or combine some parts, or have different parts arrangements.

The processor 901 is a control center of the physical machine 900, and may be a central processing unit (Central Processing Unit, CPU). The processor 901 is connected to all parts of the entire physical machine 900 by using various interfaces and lines, and is configured to perform the following operations by running or executing a software program and/or a module stored in the memory 904, and invoking program code stored in the memory 904:

receiving, by using the receiver 902, a first deployment instruction sent by a management server, where the deployment node is one of the multiple deployment nodes, and the first deployment instruction is used to instruct to deploy the application;

when the deployment node detects that a parent node of the deployment node has deployed a second application component, deploying a first application component according to the first deployment instruction, where the first application component is an application component that is in the multiple application components and that corresponds to the deployment node, and the second application component is an application component that is in the multiple application components and that corresponds to the parent node; and determining, according to the first deployment instruction, a third application component that is in the multiple application components and that corresponds to a brother node of the deployment node; and sending, by using the transmitter 903, a third deployment instruction to the brother node, where the third deployment instruction is used to instruct the brother node to deploy the third application component; or determining, according to the first deployment instruction, a fourth application component that is in the multiple application components and that corresponds to a child node of the deployment node; and sending, by using the transmitter 903, a fourth deployment instruction to the child node, where the fourth deployment instruction is used to instruct the child node to deploy the fourth application component.

In one embodiment, in the aspect of determining, by the processor 901 according to the first deployment instruction, a third application component that is in the multiple application components and that corresponds to a brother node of the deployment node, the processor is specifically configured to:

parse the first deployment instruction, so as to obtain a hierarchical relationship between the deployment node and another deployment node, and a correspondence between an application component of the application and a deployment node included in the hierarchical relationship; and determine the brother node of the deployment node according to the hierarchical relationship, and determine, according to the correspondence, the third application component that is in the multiple application components and that corresponds to the brother node.

In one embodiment, the first deployment instruction carries an application identifier of the application, and in the aspect of determining, according to the first deployment instruction, a third application component that is in the multiple application components and that corresponds to a brother node of the deployment node, the processor 901 is specifically configured to:

send, to a storage server by using the transmitter 903, a deployment relationship obtaining request that carries the application identifier, where the deployment relationship obtaining request is used to request to obtain a deployment relationship of the application;

receive, by using the receiver 902, the deployment relationship that is of the application and that is sent by the storage server in response to the deployment relationship obtaining request, where the deployment relationship of the application includes a hierarchical relationship between the deployment node and another deployment node, and a correspondence between an application component of the application and a deployment node included in the hierarchical relationship; and determine the brother node of the deployment node according to the hierarchical relationship, and determine, according to the correspondence, the third application component that is in the multiple application components and that corresponds to the brother node.

In the physical machine 900 described in FIG. 9, when detecting that the parent node of the deployment node has deployed the second application component, the deployment node may not need to wait, but directly deploy the first application component according to the first deployment instruction. At the same time, the deployment node may further instruct the brother node and the child node of the deployment node to deploy an application component. In an entire process, dependence on a server is reduced, and a deployment node may automatically deploy an application component, so as to improve flexibility of application component deployment.

It should be noted that, for brief description, the foregoing method embodiments are represented as a series of actions. However, a person skilled in the art should appreciate that this application is not limited to the described order of the actions, because according to this application, some operations may be performed in other orders or simultaneously. It should be further appreciated by a person skilled in the art that the embodiments described in this specification all belong to embodiments, and the involved actions and units are not necessarily required by this application.

In the foregoing embodiments, the description of each embodiment has respective focuses. For a part that is not described in detail in an embodiment, refer to related descriptions in other embodiments.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. An application component deployment method for deploying, on multiple deployment nodes, multiple application components of an application, the method comprising:
    receiving, by a target deployment node, a first deployment instruction sent by a management server, wherein the target deployment node is one of the multiple deployment nodes, and wherein the first deployment instruction is used to install the application;
    determining, by the target deployment node, a kinship node of the target deployment node according to the first deployment instruction, wherein the kinship node comprises a parent node, and determining, according to the first deployment instruction, a second application component of the multiple application components that corresponds to the parent node;
    sending, by the target deployment node, a second deployment instruction to the parent node, wherein the second deployment instruction is used to instruct the parent node to install the second application component thereon;
    recording, by the parent node, a deployment status of the second application component on the parent node in a storage server; and
    in response to detecting from the recorded deployment status in the storage server that the parent node has installed the second application component, deploying, by the target deployment node, a first application component according to the first deployment instruction, wherein the first application component is an application component of the multiple application components that corresponds to the target deployment node.

2. The method according to claim 1, wherein the determining of a kinship node of the target deployment node and a second application component comprises:
    parsing, by the target deployment node, the first deployment instruction to obtain a hierarchical relationship between the target deployment node and another deployment node, and a correspondence between an application component of the application and a deployment node in the hierarchical relationship; and
    determining, by the target deployment node, the parent node of the target deployment node according to the hierarchical relationship, and determining, according to the correspondence, the second application component that is in the multiple application components and that corresponds to the parent node.

3. The method according to claim 1,
    wherein the first deployment instruction carries an application identifier of the application;
    wherein the determining, by the target deployment node, of a kinship node of the target deployment node and a second application comprises:
    sending, by the target deployment node to the storage server, a deployment relationship obtaining request that carries the application identifier, wherein the deployment relationship obtaining request is used to request to obtain a deployment relationship of the application;
    receiving, by the target deployment node, the deployment relationship sent by the storage server in response to the deployment relationship obtaining request, wherein the deployment relationship of the application comprises a hierarchical relationship between the target deployment node and another deployment node, and a correspondence between an application component of the application and a deployment node in the hierarchical relationship; and
    determining, by the target deployment node, the parent node of the target deployment node according to the hierarchical relationship, and determining, according to the correspondence, the second application component that is in the multiple application components and that corresponds to the parent node.

4. The method according to claim 1, further comprising:
    determining, by the target deployment node according to the first deployment instruction, a third application component that is in the multiple application components and that corresponds to a brother node of the kinship node; and
    in response to detecting that the parent node has deployed the second application component, sending, by the target deployment node, a third deployment instruction to the brother node, wherein the third deployment instruction is used to instruct the brother node to deploy the third application component.

5. The method according to claim 1, further comprising:

deploying, by the target deployment node, a first application component according to the first deployment instruction;

determining, by the target deployment node according to the first deployment instruction, a fourth application component that is in the multiple application components and that corresponds to a child node of the kinship node; and sending, by the target deployment node, a fourth deployment instruction to the child node, wherein the fourth deployment instruction is used to instruct the child node to deploy the fourth application component.

6. The method according to claim 1, further comprising:

in response to the first application component becoming faulty during running, updating, by the target deployment node, a deployment status of the first application component to a fault state;

re-deploying, by the target deployment node, the first application component; and in response to the completion of the re-deploying of the first application component, updating, by the target deployment node, the deployment status of the first application component to a deployment completion state.

7. The method according to claim 1, further comprising:

receiving, by the target deployment node, an upgrade instruction sent by the management server, wherein the upgrade instruction instructs the target deployment node to upgrade the first application component;

updating, by the target deployment node, a deployment status of the first application component to a non-deployed state;

performing, by the target deployment node, an upgrade operation on the first application component according to the upgrade instruction; and updating, by the target deployment node, a deployment status of the upgraded first application component to a deployment completion state.

8. A physical machine with multiple deployment nodes deployed thereon, comprising:

a processor;

a receiver;

a transmitter; and a memory;

wherein the processor, the receiver, the transmitter, and the memory are separately connected to a communications bus;

wherein the memory stores program code, which, when executed by the processor, causes the processor to perform the following operations:

receiving, by using the receiver, a first deployment instruction sent by a management server, wherein the deployment node is one of the multiple deployment nodes, and wherein the first deployment instruction is used to install an application;

determining a kinship node of the deployment node according to the first deployment instruction, wherein the kinship node comprises a parent node, and determining, according to the first deployment instruction, a second application component of the multiple application components that corresponds to the parent node; and sending a second deployment instruction to the parent node by using the transmitter, wherein the second deployment instruction is used to instruct the parent node to install the second application component thereon;

recording, by the parent node, a deployment status of the second application component on the parent node in a storage server; and in response to detecting from the recorded deployment status in the storage server that the parent node has installed the second application component, deploying a first application component according to the first deployment instruction, wherein the first application component is an application component of the multiple application components that corresponds to the target deployment node.

9. The physical machine according to claim 8, wherein the determining of a kinship node and a second application component includes parsing the first deployment instruction, so as to obtain a hierarchical relationship between the deployment node and another deployment node, and a correspondence between an application component of the application and a deployment node in the hierarchical relationship; and determining the parent node of the deployment node according to the hierarchical relationship, and determine, according to the correspondence, the second application component that is in the multiple application components and that corresponds to the parent node.

10. The physical machine according to claim 8, wherein the first deployment instruction carries an application identifier of the application, and wherein the kinship node comprises a parent node, and wherein the determining, according to the first deployment instruction, of a second application component includes sending, to the storage server by using the transmitter, a deployment relationship obtaining request that carries the application identifier, wherein the deployment relationship obtaining request is used to request to obtain a deployment relationship of the application;

receiving, by using the receiver, the deployment relationship sent by the storage server in response to the deployment relationship obtaining request, wherein the deployment relationship of the application comprises a hierarchical relationship between the deployment node and another deployment node, and a correspondence between an application component of the application and a deployment node comprised in the hierarchical relationship; and determining the parent node of the deployment node according to the hierarchical relationship, and determining, according to the correspondence, the second application component that is in the multiple application components and that corresponds to the parent node.

11. The physical machine according claim 8, wherein the kinship node further comprises a brother node, and the processor is further configured to perform the following operations:

determining, according to the first deployment instruction, a third application component that is in the multiple application components and that corresponds to the brother node; and in response to the deployment node detecting that the parent node has deployed the second application component, sending a third deployment instruction to the brother node by using the transmitter, wherein the third deployment instruction is used to instruct the brother node to deploy the third application component.

12. The physical machine according to claim 8, wherein the kinship node further comprises a child node, and after the deploying a first application component according to the first deployment instruction, the processor is further to perform the following operations:
   determining, according to the first deployment instruction, a fourth application component that is in the multiple application components and that corresponds to the child node; and
   sending a fourth deployment instruction to the child node by using the transmitter, wherein the fourth deployment instruction is used to instruct the child node to deploy the fourth application component.

13. The physical machine according to claim 8, wherein the processor is further to perform the following operations:
   in response to the first application component becoming faulty during running, updating a deployment status of the first application component to a fault state;
   re-deploying the first application component; and
   in response to the deployment node completing re-deploying the first application component, updating the deployment status of the first application component to a deployment completion state.

14. The physical machine according to claim 8, wherein the processor is further to perform the following operations:
   receiving, by using the receiver, an upgrade instruction sent by the management server, wherein the upgrade instruction instructs the deployment node to upgrade the first application component;
   updating a deployment status of the first application component to a non-deployed state;
   performing an upgrade operation on the first application component according to the upgrade instruction; and
   updating a deployment status of the upgraded first application component to a deployment completion state.

15. A non-transitory computer-readable medium storing computer instructions for application component deployment, that when executed by one or more processors, cause the one or more processors to perform the method, and the method comprising:
   receiving, by a target deployment node, a first deployment instruction sent by a management server, wherein the target deployment node is one of the multiple deployment nodes, and wherein the first deployment instruction is used to install the application;
   determining, by the target deployment node, a kinship node of the target deployment node according to the first deployment instruction, wherein the kinship node comprises a parent node, and determining, according to the first deployment instruction, a second application component of the multiple application components that corresponds to the parent node;
   sending, by the target deployment node, a second deployment instruction to the parent node, wherein the second deployment instruction is used to instruct the parent node to install the second application component thereon;
   recording, by patent parent node, a deployment status of the second application component on the parent node in a storage server; and
   in response to detecting from the recorded deployment status in the storage server that the parent node has installed the second application component, deploying, by the target deployment node, a first application component according to the first deployment instruction, wherein the first application component is an application component of the multiple application components that corresponds to the target deployment node.

16. The medium according to claim 15, wherein the determining, by the target deployment node, of a kinship node and a second application component comprises:
   parsing, by the target deployment node, the first deployment instruction, to obtain a hierarchical relationship between the target deployment node and another deployment node, and a correspondence between an application component of the application and a deployment node comprised in the hierarchical relationship; and
   determining, by the target deployment node, the parent node of the target deployment node according to the hierarchical relationship, and determining, according to the correspondence, the second application component that is in the multiple application components and that corresponds to the parent node.

17. The medium according to claim 15,
   wherein the first deployment instruction carries an application identifier of the application; and
   wherein the determining, by the target deployment node, of a kinship node of the target deployment node and a second application component comprises:
   sending, by the target deployment node to the storage server, a deployment relationship obtaining request that carries the application identifier, wherein the deployment relationship obtaining request is used to request to obtain a deployment relationship of the application;
   receiving, by the target deployment node, the deployment relationship sent by the storage server in response to the deployment relationship obtaining request, wherein the deployment relationship of the application comprises a hierarchical relationship between the target deployment node and another deployment node, and a correspondence between an application component of the application and a deployment node in the hierarchical relationship; and
   determining, by the target deployment node, the parent node of the target deployment node according to the hierarchical relationship, and determining, according to the correspondence, the second application component that is in the multiple application components and that corresponds to the parent node.

18. The medium according to claim 15, wherein the method further comprises:
   determining, by the target deployment node according to the first deployment instruction, a third application component that is in the multiple application components and that corresponds to a brother node of the kinship node; and
   in response to detecting that the parent node has deployed the second application component, sending, by the target deployment node, a third deployment instruction to the brother node, wherein the third deployment instruction is used to instruct the brother node to deploy the third application component.

19. The medium according to claim 15, wherein the method further comprises:
   deploying, by the target deployment node, a first application component according to the first deployment instruction;
   determining, by the target deployment node according to the first deployment instruction, a fourth application component that is in the multiple application components and that corresponds to a child node of the kinship node; and sending, by the target deployment node, a fourth deployment instruction to the child node, wherein the fourth deployment instruction is used to instruct the child node to deploy the fourth application component.

20. The medium according to claim 15, wherein the method further comprises:

in response to the first application component becoming faulty during running, updating, by the target deployment node, a deployment status of the first application component to a fault state;

re-deploying, by the target deployment node, the first application component; and in response of the completion of re-deploying the first application component, updating, by the target deployment node, the deployment status of the first application component to a deployment completion state.

\* \* \* \* \*

UNITED STATES PATENT AND TRADEMARK OFFICE
CERTIFICATE OF CORRECTION

PATENT NO. : 10,684,850 B2  
APPLICATION NO. : 16/278556  
DATED : June 16, 2020  
INVENTOR(S) : Huan Zhu, Qi Zhang and Yuqing Liu Page 1 of 1

It is certified that error appears in the above-identified patent and that said Letters Patent is hereby corrected as shown below:

In the Claims

Claim 15, Column 37, Line 60, "recording, by patent parent node, a deployment status of...," delete the word "patent"

Signed and Sealed this  
Seventeenth Day of November, 2020

Andrei Iancu  
*Director of the United States Patent and Trademark Office*